United States Patent
Mizrahi et al.

(10) Patent No.: US 7,092,821 B2
(45) Date of Patent: Aug. 15, 2006

(54) LARGE GROUP INTERACTIONS VIA MASS COMMUNICATION NETWORK

(75) Inventors: Aharon Ronen Mizrahi, Tenafly, NJ (US); Amir Meir Weisenstern, Edgewater, NJ (US)

(73) Assignee: Invoke Solutions, Inc., Tenafly, NJ (US)

(*) Notice: Subject to any disclaimer, the term of this patent is extended or adjusted under 35 U.S.C. 154(b) by 229 days.

(21) Appl. No.: 10/258,822

(22) PCT Filed: May 1, 2001

(86) PCT No.: PCT/IL01/00391

§ 371 (c)(1),
(2), (4) Date: Oct. 25, 2002

(87) PCT Pub. No.: WO01/84266

PCT Pub. Date: Nov. 8, 2001

(65) Prior Publication Data

US 2003/0227479 A1    Dec. 11, 2003

Related U.S. Application Data

(60) Provisional application No. 60/200,837, filed on May 1, 2000.

(30) Foreign Application Priority Data

Feb. 11, 2001  (IL) ..................................... 141376

(51) Int. Cl.
*G06F 19/00* (2006.01)
*G06F 17/30* (2006.01)
(52) U.S. Cl. .................. 702/1; 705/1; 705/10; 705/500

(58) Field of Classification Search ................ 709/204, 709/206, 207; 702/182; 379/900; 345/753; 707/4
See application file for complete search history.

(56) References Cited

U.S. PATENT DOCUMENTS

| | | | |
|---|---|---|---|
| 5,404,509 A | 4/1995 | Klein | |
| 5,544,299 A | 8/1996 | Wenstrand et al. | |
| 5,880,731 A | 3/1999 | Liles et al. | |
| 5,974,446 A | 10/1999 | Sonnenreich et al. | |
| 5,978,835 A | 11/1999 | Ludwig et al. | |
| 5,995,951 A | 11/1999 | Ferguson | |
| 6,061,440 A | 5/2000 | Delaney et al. | |
| 6,249,809 B1 | 6/2001 | Bro | |
| 6,256,663 B1 * | 7/2001 | Davis | 709/204 |
| 6,304,861 B1 | 10/2001 | Ferguson | |
| 6,347,333 B1 | 2/2002 | Eisendrath et al. | |
| 6,442,590 B1 * | 8/2002 | Inala et al. | 709/204 |
| 6,578,025 B1 * | 6/2003 | Pollack et al. | 707/2 |
| 6,792,448 B1 * | 9/2004 | Smith | 709/204 |
| 2002/0072955 A1 | 6/2002 | Brock | |
| 2002/0194054 A1 | 12/2002 | Frengut | |
| 2003/0088458 A1 | 5/2003 | Afeyan et al. | |

* cited by examiner

FOREIGN PATENT DOCUMENTS

WO    WO 02/057986    7/2002

*Primary Examiner*—Patrick J. Assouad
(74) *Attorney, Agent, or Firm*—Fenster & Company

(57) ABSTRACT

A method of supporting mass human-interaction events, including: providing a mass interaction event by a computer network (100) in which a plurality of participants (102) interact with each other by generating information comprising of questions, responses to questions and fact information for presentation to other participants and assimilating information: and controlling, automatically by a computer (104) the rate of information presentation to each participant, to be below a maximum information assimilation rate of each participant.

165 Claims, 8 Drawing Sheets

FIG.1

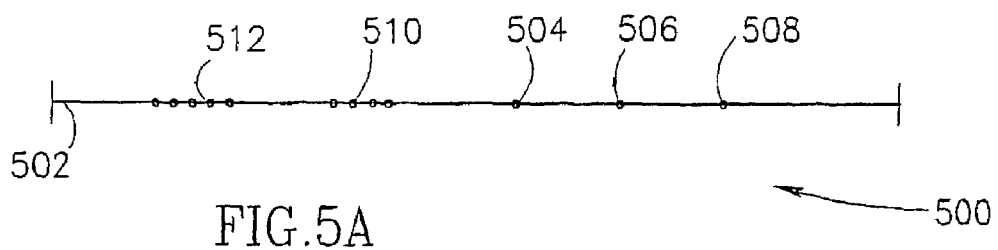
FIG.5A
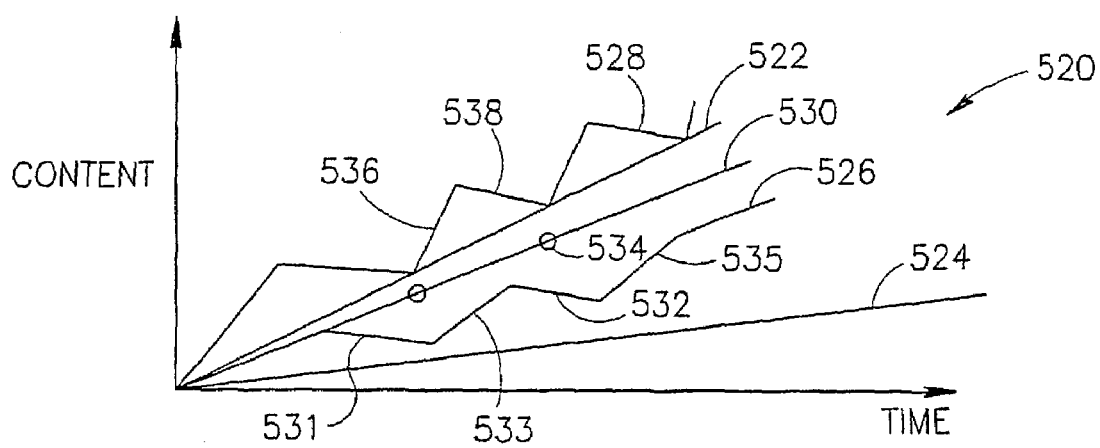
FIG.5B
A B C D E ← 542
A B D E ← 544    ← 540
A B C D D$_2$ E ← 546
A' B' C D E' ← 548
C D E A B' ← 550
FIG.5C

LARGE GROUP INTERACTIONS VIA MASS COMMUNICATION NETWORK

RELATED APPLICATIONS

This application is a U.S. national filing of PCT Application No. PCT/IL01/00391, filed on May 1, 2001. This application claims the benefit under 35 U.S.C. §119(e) of U.S. Provisional Application No. 60/200,837, filed on May 1, 2000, the disclosure of which is incorporated herein by reference.

FIELD OF THE INVENTION

The present invention is related to the field of interactions between large numbers of people using a communications network and especially such interactions that are mediated via an Internet.

BACKGROUND OF THE INVENTION

Although the Internet is touted as turning the world into a large village, interactions between large groups of individuals are not typically handled in a synchronous manner such as would be expected in a "village". In such a conversation-like synchronous interaction, individuals generally expect a response within a short, bounded time, which response allows a further discussion and a comfortable flow of information.

Most interactive solutions only work when the audience for an information provision event is small, such as under 20 or 30 participants. In larger groups, the audience is either entirely passive, as in television, or can only interact asynchronously, such as via a message board. Generally, as the group gets larger, the interaction becomes more difficult. In token-based systems, where only one participant can present information at a time, most participants cannot participate. In free-for-all systems, the noise level is too high. Even in mediated systems, such as "chat rooms", the mediator becomes overwhelmed if there are too many participants. Furthermore, a significant amount of the audience's time is wasted on questions that are of no interest to most of the audience.

Exemplary ways of transmitting information on the Internet (and outside of it) include:

(a) Static or dynamic downloadable content, such as WWW pages, text, graphics and video (corresponding to books and video cassettes).

(b) Interactive software, for use in a home setting.

(c) Conferencing tools for enabling a small group of persons to interact as if they were in one large room.

(d) Voting tools, where participants can answer a poll regarding a particular posed question.

(e) Web-Casting tools, which stream a live or recorded event to a large number of participants.

(f) Chat rooms, where each participant can voice an opinion.

A particular type of interaction event occurs during on-line education. It would be extremely desirable to have very large classes, thus keeping costs down and making gifted lecturers available to large audiences. However, as noted above, such large classes do not usually provide a reasonable interaction level. For many students, interaction in class is a requirement for complete understanding of the learning material. Currently however, interactive on-line classes are limited to small numbers. Furthermore, much of the student participation is after the class and/or via a message board.

It is known i n on-line education systems to divide a class into groups and provide open discussion questions for each group. It is also known to provide credit points to students that find suitable source material in an on-line class.

SUMMARY OF THE INVENTION

An object of some embodiments of the invention is the provision of methods and apparatus for conducting interactive events, especially synchronous events, with large numbers of participants, such as 100, 1,000, 10,000, 50,000, 100,000 or even 1,000,000 or more.

A property that typifies many mass interaction events and imposes difficulty in carrying out a useful interaction, is that large amounts of information are generated and/or provided during the event. A substantial portion of this information is generated by the participants themselves and, in a synchronous interaction, it is generally desirable for other participants to assimilate the generated information as it is generated. As used herein, the term mass-interaction is used to describe an interaction event in which the aggregate amount of information generation rate is greater than that which can be assimilated by a participant.

In an exemplary embodiment of the invention, the exposure of information to a participant is controlled so that the exposure rate is smaller than the maximum that the participant can assimilate. Alternatively or additionally, the information in the event is made more effective and/or less effective information is not propagated. In an exemplary embodiment of the invention, however, new information is given a fair chance at being disseminated between participants. For example, new information is exposed to a minimum number of participants so that it can be given a meaningful rank, which rank is used as a basis for deciding if and how to disseminate the information. The mini mum and maximum exposures are typically traded off to achieve an event that is meaningful, has a desired feeling of interactivity, yet cognitively acceptable to the participants. In an exemplary embodiment of the invention, the feeling of interactivity is determined by applying one or more rules that relate exposure statistics to interactivity. Alternatively or additionally, the feeling is determined by feedback from participants.

While these principles of information exposure could, in theory, be applied by the participants themselves, a greater effectiveness is provided by a computer applying these principles so that a participant can focus on the event. In addition, the application of the principles by a computer is more correct and/or can take into effect a greater amount of information (e.g., relative rankings) than can a human.

In an embodiment of the invention, an interactive event is managed using one or more of the following methodologies:

(a) providing different and flexible time lines to different participants;

(b) utilizing the audience as a resource;

(c) providing a hierarchy in responding to queries from the audience;

(d) dividing up the audience into dynamic ad-hoc groups;

(e) selective distribution of questions and answers in the audience and between the audience and a presenter;

(f) utilizing previous questions and answers for responding to current questions;

(g) structuring and restructuring a participant's experience, for example, to reduce interruptions to the participant in the middle of a different subject or to reorder presented information so that it forms a series of single-subject segments, possibly having a minimum useful length;

(h) segmenting questions into sub-questions, for example, to allow exposing the sub-questions to wider audiences that may be interested and/or to reduce disorder and thrashing in the question answering process;

(i) providing effective feedback to the presenter, from the audience; and/or (j) providing ranking of information, to assist in identifying relevant and irrelevant information, such ranking may be, for example, by relevance or by interest level, possibly of a particular participant in an event.

An aspect of some embodiments of the invention relates to time line manipulation in an interactive event. In an embodiment of the invention, the presenter and the different participants in the audience, can each experience a different time line. Optionally, the time lines are coupled to a single "event" time line. By allowing flexibility in the time line, a participant can control the amount of time he allocates to different information elements, thus, slowing for difficult material and speeding up or skipping easy material. Optionally, the responses of the system to the participant are based on the participant's subjective time, not necessarily on the system's time line.

In an embodiment of the invention, a participant can accelerate, decelerate, fast forward or rewind his personal time line. Alternatively or additionally, a participant can cut out sections of the time line or add new sections (including advertisements) not experienced by other participants.

Although multiple time lines are thus created, in an embodiment of the invention, means (described below), such as messaging and chat tools, are provided for the different participants to communicate with each other. Optionally, means for rejoining the main event time line or other time lines, is provided. The number of different allowed time lines may be limited or unlimited. In some embodiments of the invention, the different time lines may be constrained to a subset of particular discrete values. For example, a single event may include 2, 10, 100, 1000 or any smaller, greater or intermediate number of time lines.

Optionally, although live verbal interaction between persons in different time lines is possible, in an embodiment of the invention, the interaction takes the form i of written questions and answers. Written vs. verbal interaction has the benefit of allowing a delay of a few seconds or minutes between receiving a question and answering it, without detracting from the feeling of interactivity. This delay may be used, for example, to allow the person who answers the question to reacquaint himself with the subject matter presented at the current time of the time line of the question presenter.

Optionally, a question presenter has associated information that assists in determining his difficulties. In one example, the presenter has an associated user profile that indicates areas of weakness and strength. In another example, the temporal trajectory, e.g., the rate of advance through time, in this or other events, is used to identify areas of difficulty (e.g., areas where the rate is lower). Alternatively, the user profile is manually entered, for example by the participant or by his teachers. Optionally, temporal rate profiles of other participants, possibly from previous events are used to assist in classifying the participants' learning difficulties.

Alternatively or additionally to the participant controlling his time line, the presenter can also control his time line. In one example, the presenter starts his presentation 10 minutes before the official start and the resulting presentation is buffered. Thus, the presenter has 10 minutes available for analyzing participants' questions, without delaying the reception of his presentation by the participants.

In an embodiment of the invention, time is managed as a serial progression. However, also random progression can be supported, for example, one participant experiencing one order of events and another participant experiencing another order of events.

In some embodiment of the invention, an event outline is made available before an event. Optionally, this outline is used by the participants to plan a desirable time line and/or temporal rate trajectory for themselves. Generally however, some or even all of the time line manipulation is performed ad hoc.

It is noted that such a flexible time line scheme may also be applied to non-live events. In such events, there may be a main event time line that many participants are synchronized with, or there may be no such main event time line. It is noted however, that even if the presentation is not live, the participants and their questions are both live and can serve as a basis for the event, for example, the gathering period of an off-line event (if one exists) can serve as a basis for such a time line. In a particular embodiment of the invention, especially if the event content is prerecorded, a main time line may be split and then re-split, defining a tree-like structure. Alternatively or additionally, multiple time lines may be merged. Alternatively or additionally, an event may start at several different time lines.

In an exemplary embodiment of the invention, an event is restructured and/or organized at a low level, for example, setting which participants can contact and/or hear other participants or questions. Alternatively or additionally to changing the content that arrives at a participant, the time lines are automatically adjusted. In an exemplary embodiment of the invention, the reorganization is used to reduce interruptions, for example, delaying messages (or changing a participant's time line), so that the participant's event is more organized, with larger stretches of single subject attention, than would be mandated by the number and distribution of interruptions from various sources.

An aspect of some embodiments of the invention relates to treating the audience as a resource, rather than only as an information drain. Exemplary uses of the audience (especially of selected participants thereof), include:

(a) providing assistance to other participants, for example by answering their questions;

(b) filtering out questions that are not worthy of the attention of the rest of the audience (e.g., by individuals of the audience or by ranking);

(c) combining similar questions into single questions, thus reducing the number of questions a presenter is required to answer;

(d) dissecting a question into several questions, thus expanding a single subject into several subjects;

(e) providing feedback on the audience comprehension level and/or particular problems experienced by the audience to the presenter;

(f) policing the class, for example identifying and/or silencing trouble makers;

(g) ranking the relative importance of questions and/or other types of feedback.

In some embodiments, at least some of the assisting participants are chosen ahead of time. Alternatively or additionally, at least some of the assisting participants are identified and/or recruited ad hoc, during the event. Optionally, these assisting participants act as a backbone of the audience. However, it is noted that parts of this "backbone" may change in the course of a singe event. The very existence of such a backbone may be useful for the presenter to identify polarization in the audience.

An aspect of some embodiments of the invention relates to maintaining a hierarchy for answering of questions while providing real-time information about which the questions are asked. In an embodiment of the invention, when a question is asked by a participant, it is passed to a small number of participants and then percolates up the hierarchy until it is either answered, blocked or reaches the presenter. This percolation may be automatic, semi automatic or manual. Optionally, the parameters of question propagation are determined to achieve a desired response time to a question and/or maintaining a desired exposure level of the question to the participants. The answers may be provided to various ones of the actors, for example, the actor who posed the question, the actors through which the question passed and/or actors having filter-settings that match the question and/or answer attributes.

An aspect of some embodiments of the invention relates to ranking of question, answers, participants and/or assisting participants. The rankings optionally serve as a tool to reduce the propagation of low quality information and/or for the identification of suitable assisting participants. Optionally, an incentive is provided to the participants to enter rankings, for example enhanced features, such as rank-based filtering may be provided to those participants that enter ranks. Alternatively or additionally, a penalty may be applied to participants that enter junk ratings (for example randomly varying), for example lowering the relative weight of their rankings.

In an embodiment of the invention, questions and/or other types of feedback are ranked, with higher ranking questions advancing faster and/or further. The ranking may be, for example, by some or all of the participants in general, by computer (e.g., based on the number of participants interested) or by the assisting participants.

Alternatively or additionally, answers to the question are ranked. Alternatively or additionally, the participants themselves are ranked, for example concerning their ability to answer questions and/or concerning their strong and weak fields.

In some embodiments, the ranking is a scalar. In other embodiments, however, the ranking is a vector of different rank values for different attributes of the information being ranked. For example, information that, based on its rank, is irrelevant for one participant due to that participant's field of interest, may be considered relevant for another participant. In some embodiments of the invention a "join question" feature is provided, to allow a participant to join another participants question. Such joining may assist in generating a ranking. Alternatively or additionally, such a feature assists in generating a hierarchy of questions and participants that have interest in the questions. In an exemplary embodiment of the invention, a participant can simultaneously belong to (possibly at different levels of interaction) 1, 2, 5, 10, 20 or any smaller, greater or intermediate number of questions/ groups at any given time. A participant may be offered to join a new group. Such an offer may be often, for example, once an hour, once every ten minutes, once every five minutes, once a minute or any lower, higher or intermediate rate. Optionally, a participant is not required to respond to a group join suggestion and is disappears after a while. Alternatively or additionally, the number of offers shown is dependent on the number of offers the participant responded to in any way. Alternatively or additionally, the participant may actively view group listings and select a group to join.

In an exemplary embodiment of the invention, ranking and/or matching of a question to a participant are used for filtering of the information provided to a participant. Possibly, the filtering is applied at a server side of the system. Alternatively or additionally, the filtering is applied at a client side of the system.

An aspect of some embodiments of the invention relates to the ad-hoc creation of groups of participants. In an embodiment of the invention, a group is created around the interest in a particular question or other issue and/or a shared time line and/or other participant characteristic. Thus, once the question is answered, the group may dissolve. Further, as participants in the group feel the question is answered and/or is less important, they may leave the group. Alternatively or additionally, new participants may join over time.

In an exemplary embodiment of the invention, a trigger is provided in the form of content entered into the system (e.g., a question or part of the event). This content is exposed to a sampling of the participants in the event. Each of the exposed persons can choose to join the trigger or not. The act of joining (or other responsive actions) defines an ad-hoc group. The degree of joining can indicate the degree of participation in the group. A small scale interaction occurs within the thus formed ad-hoc group. After a time, the group may, for example, fall apart, split, stay alive and/or expand or shrink k. For example, such ad-hoc groups can form for one or more of closing a gap of misunderstanding in the event, making a statement and/or making a suggestion.

In an embodiment of the invention, human and/or computer moderators are provided to manage the ad-hoc (and/or relatively stable groups) groups and/or control the propagation of questions inside and/or between groups. In some cases, a moderator assists in converting an ad-hoc group into a semi-stable group, or dissolves an existing group. Thus, moderator may manage the group geometry and/or the group discussion and/or activities. In an embodiment of the invention, the moderator maintains the size of the group within limits, to maximize the efficacy of the group. These limits may be absolute or they may depend on the group dynamics. In one example, if the group grows too large, the moderator may split it. In another example, the rate of percolation of questions and/or answers may be controlled, to allow the group to stabilize. In some embodiments, a moderator maintains certain measures of a group within predefined thresholds, for example, the number of participants in a group or how far a question can propagate. In some embodiments of the invention, a group is maintained large enough so that various statistics can be gathered and/or so that there is a significant probability of the questions being answered, but not so large that information overload problems occur. In some cases, the group membership may be modified to achieve one or more of the above goals.

In some embodiments, the moderator is a participant, however, with enhanced privileges, for example, such a moderator may be able to amend questions, reply to questions pose new questions to the participants and/or fold a group.

It is noted that a single participant can belong to a plurality of groups. In addition, a hierarchy of groups may be defined, with higher-level groups including, as members, lower level groups. Such a hierarchy may be useful if a group relates to a general subject and the sub-groups relate to- refinements of the subject or particular details. For example, such a hierarchy of groups and/or levels of dealing with questions can be 1, 2, 5, 10 or any smaller, larger or intermediate number of hierarchical levels.

An aspect of some, embodiments of the invention relates to policing a mass interaction. In an exemplary embodiment of the invention, participants are encouraged to complain about abusive behavior or inappropriate submissions. Optionally a mediator (or software unit) is designated a complaint manager. Alternatively or additionally, automatic detection methods, for example, identification of profanity words, or detection of an inordinate commenting g rate, are used.

An aspect of some embodiments of the invention relates to guiding of interaction dynamics. In an exemplary embodiment of the invention, such guiding includes one or more of focusing of an event towards a desired goal, encouraging and/or discouraging discussion, duration of group survival, group splitting and/or merging, number of groups and/or size of groups, modifying a content of the interaction, merging time lines of different participants and/or shifting an interaction along the scale between asynchronous and synchronous.

In an exemplary embodiment of the invention, such guiding is provided by a mediator, a presenter and/or a choreographer. Alternatively or additionally, such guiding may be at least assisted by automated means, for example, tools to measure a controlled variable (e.g., question branching rate), damping tools (e.g., reducing exposure to far-out questions or deleting questions) and/or injection of previously prepared questions.

An aspect of some embodiments of the invention relates to utilizing previous occurrences of the event for dealing with real-time questions. In an embodiment of the invention, a database of many or all previously asked questions and answers is maintained. When a participant asks a question, the question is automatically compared against the database instead of- or in addition to- being presented to other participants. Thus, a participant in a repeating lecture can take advantage of previous participants' thoughts. Alternatively or additionally, the system can study a participant, over the course of an event and/or between events, for example, to determine which participants are suitable to be assisting participants, which participants ask relevant questions, which participant knows how to answer questions, and/or which participant's rankings are more to the point. Such learned information may change over time.

An aspect of some embodiments of the invention relates to providing integrative feedback to a presenter. In an embodiment of the invention, the feedback is provided as a separate channel to the presenter. In some embodiments, a two-directional feedback channel is provided between the participants and the presenter(s). Optionally, the data in the feedback channel is processed by a human and/or computer agent. In contrast to question-response feedback, in which a presenter asks the audience if the point is clear, integrative feedback can automatically provide feedback. Exemplary feedback types include:

(a) Points in the time line that slow participants the most;
(b) Questions that have large group followings;
(c) Polarization and fractionalization of the class;
(d) Number and/or ratio of content-related and unrelated messages between participants;
(e) Number of interacting participants;
(f) Number of questions that are not propagated very far (if at all) (reflects on the quality of understanding); and/or
(g) quality of questions, discussions and/or answers (e.g., based on ranking or based on amount of attention given by participants).

An aspect of some embodiments of the invention relates to providing a secondary, possibly commentary or critical, channel in parallel with an information-providing channel, in a live or recorded interaction event. In one example, a lecturer presenting a republican point of view will be supplemented by a "democratic" criticism line. The criticism may be provided by a second presenter. Alternatively, this criticism may be generated automatically from the questions and/or other feedback from the audience. In some embodiments, there is no discourse between the presenters of the main and secondary channel, for example if there are 50 secondary channels, a single presenter might not have time to respond to all of them.

One or both of the information channel and the criticism channel may be personalized for a particular participant, for example, certain section of the information channel may be cut out. Alternatively or additionally, only criticism from certain groups of participants, that meet a participant-provided profile, is presented. In some embodiments, more than one presentation channel may be available, optionally, one of the channels being a main channel.

An aspect of some embodiments of the invention relates to personalization of a participant's interaction in a large group Internet interaction event. In an embodiment of the invention, the personalization affects one or more of: the information content received from a presenter, groups to which the participant is joined and/or allowed to join, the propagation of questions and answers to and from the participant, willingness and capability to be an assisting participant, degree of privacy of the participant and/or the content and/or form of a criticism channel viewed by the participant. In an embodiment of the invention, the personalization is directly affected by a personalization profile chosen by the participant. Alternatively or additionally, the personalization is dependent on commercial considerations, for example, whether the participant is willing to be an assisting participant or willingness to be targeted by advertisements. In some embodiments, the time-line of the participants is personalized to his needs, in real-time and/or based on a plan.

An aspect of some embodiments of the invention relates to tools for displaying a structured ongoing event to a participant. In an exemplary embodiment of the invention, the structure includes a QAC structure including a Question, one or more Answers and one or more Comments on the answers. Alternatively or additionally, other structures may be supported, for example, SQAC, which includes a Statement triggering one or more questions. In an exemplary embodiment of the invention, the structured event is a mass interaction event. Alternatively, the structured event is a chat room (e.g., synchronous) or a bulletin board (e.g., asynchronous).

In an exemplary embodiment of the invention, an archive view is provided, which allows to sort the structures, for example by subject, participants, time line or relation to other structures or interaction content (e.g., slides).

Alternatively or additionally, a dynamic view is provided. In an exemplary embodiment of the invention, the dynamic view includes a scrolling view of questions, answers and comments. The scrolling may be smooth and/or stepped. In an exemplary embodiment of the invention, when a response, e.g., an answer, a further question or a comment, is shown, its associated question, answer or comment is displayed, for example as part of the scrolling view or in a separate window, to provide context for understanding the new information provided by the response. In an exemplary embodiment of the invention, the content of the scrolling view is filtered to contain only part of the available information, for example, to match a participant's rate of information assimilation. Alternatively or additionally, the items are reordered to form a series of segments of a single thread.

Thus, in an exemplary embodiment of the invention, items are provided with a context. Such a context may be a content context—e.g., the source question, a last answer, a highest ranking or most relevant answer (or other items to which the new item is a response). Alternatively or additionally, the context may be ranking context, for example, a ranking of the new item or of the thread as a whole. Alternatively or additionally, the context may be a personal context, for example, indicating the amount of time already spent on the item or a relation to other current threads or displayed items. Optionally, this amount is increased when the user pauses the display when the item is shown and/or interacts with a specific item.

The use of a limited structure, while possibly reducing the flexibility of free-conversation, in that not all types of clarification questions and digressions are allowed, nevertheless imposes a structure on the interactions and possibly serves to reduce unnecessary proliferation of information flow, especially to such participants that might not be interested in such digressions.

In some embodiments of the invention, the above tools and techniques are used for supporting large interaction education on the Internet, with the presenter being a teacher and the participants being students.

Another type of application is conferences, where large numbers of persons group to hear lectures and panel discussions, attend workshops and interact with each other.

Another type of application is a help desk application, where other users of a product can assist a user with a question and/or clarify the exact question among themselves, so that a better and more focused answer can be provided by the product support provider.

Another type of application is one in which participant feedback is desired, such as in political speeches or in infomercials. The presenter desires to have the audience respond with questions and agree with the presented opinion/product, while at the same time, to maintain control over the information presented and degree of understanding of the audience.

Another type of application is the presentation of personalized news. A participant in a news broadcast may have particular questions. Further, he may desire to hear a particular slant of the news. One or more of these objects can be achieved by a participant being grouped, optionally ad-hoc, with other news viewers with similar questions and/or desired slants. Alternatively or additionally, a criticism channel that matches or complements the participants' slant may also be provided. The distinction between news and opinion polls may become blurred as the participants not only indicate how they perceive the news but may also ask questions and/or provide other feedback that is indicative of the participant's views.

An aspect of some embodiments of the invention relates to tracking the interaction between participants and using the tracked information to assist in managing the interaction between the participants. The information may be used, for example, by human managers and/or by automated software managers.

An aspect of some embodiments of the invention relates to the creation of an ad-hoc chat room and peopling it in response to an information request, such as a question or a comment on a WWW page. In an embodiment of the invention, the chat room is peopled with the questioner, one or more persons that may be expected to know the answer to the question or provide suitable information (e.g., based on personal history or previously exhibited answering ability in certain fields), and/or one or more additional persons that might find the discussion of interest. In an embodiment of the invention, the relevant persons are identified automatically by a computer from a pool of available participants. These participants may be taking part in an event or they may be otherwise connected- or having the potential to be connected- to the Internet. In some embodiments of the invention, the interactions in the room are recorded, for example for targeted advertising or to assist in identifying potential participants that can answer questions or form a focus of a discussion. Various incentives may be offered to the persons peopling the chat room, for example monetary incentives or free services.

In some cases, the questioner is not in the chat room. Rather, the finished answer may be provided to him. In an embodiment of the invention, an information request is percolated up through a hierarchy of plausible responders, until a suitable answer is provided. Some embodiments of the invention are practiced using non-computer communication devices, for example telephones and cellular telephones. In one example, a service person may be called when the question is deemed important enough or long-lived enough for him to answer. A particular feature of cellular telephones, but also of some types of man-computer interactions such as using multi-window operating systems, is that a person may be doing a completely unrelated activity, such as driving, while talking or listening on the cellular telephone. Some of the participants, may not respond to a particular question of discussion at all, for example if they are only monitoring an event sporadically, e.g., manually and/or using automated alerts for relevant information. In some cases, an auto-replay or auto-slow feature may be desirable to compensate for times when the participant's attention wandered due to his other tasks.

There is therefore provided in accordance with an embodiment of the present invention, a method of supporting the happening of a mass-interaction event, comprising providing a mass interaction event in which a plurality of participants interact with each other by generating information comprising at least one of questions, responses to questions and fact information for presentation to other participants and assimilating information, and controlling, automatically by a computer, the rate of information presentation to each participant of said plurality of participants, to be below a maximum information assimilation rate of said each participant.

Optionally, the mass-interaction event is characterized by the event being time bound and/or by having a general temporal order. Optionally, the mass-interaction event is characterized by the plurality of participants all attending to the event at the same time, while the event is going on and/or by the plurality of participants expecting fast responses to information they generate. Optionally, the controlling comprises controlling in real-time.

Optionally, the rate is less than 30 words per minute. Alternatively, the rate is at least 30, 50, 100, 200 or 300 words per minute. Optionally, the rate is fixed for the event. Alternatively, the rate is dynamic for the event. Optionally, the rate varies between participants.

Optionally, the rate is dependent on at least one of an expected difficulty by a participant in assimilating the information, an interruption rate of said participant, a number of different subjects covered by said information, a matching between said information and views of said participant and other activities of said participant. Optionally, the plurality of participants comprises at least 50, 100, 1000, 10,000, 100,000 or 1,000,000 participants.

In some embodiments of the invention, the plurality of participants each has an average rate of information generation of at least 0.1, 1 or 10 words per minute. Optionally, the event includes a plurality of passive listeners. Optionally, the at least one of the participants comprises at least one presenter, characterized in the presenter generating a main line of said event. Optionally, the at least one presenter comprises at least two main presenters.

Optionally, the method includes providing at least one set of presentation material used by said presenter to present said main line.

Optionally, at least a subset of the plurality of participants can cooperate to change the main line of said event. Optionally, at least one of the participants comprises a mediator, characterized in the mediator at least assisting in organizing the event. Optionally, the mediator comprises a group mediator that mediates a discussion by a group of participants. Alternatively or additionally, the mediator comprises an event mediator that assists in organizing the an ongoing event as a whole. Further alternatively or additionally, the mediator comprises a controller mediator that prevents misuse of the event. Optionally, the at least one mediator is organized in a hierarchy of mediators.

Optionally, at least one of the participants comprises a choreographer, characterized in the choreographer planing at least a part of the event. Alternatively or additionally, at least one of the participants comprises an answering assistant, characterized in the answering assistant answering questions raised by other participants.

Optionally, controlling the rate comprises controlling the rate using different methods for different participant types. Alternatively or additionally, controlling the rate comprises providing different time lines for different participants. Optionally, different time lines are characterized by having different progression rates for different parts of the time line and/or different content order of content of the event. Alternatively or additionally, different time lines are characterized by covering different content.

In some embodiments of the invention, the method includes providing a participant with a tool showing different time lines being used by other participants and/or with a tool for accelerating the flow of information in his time line to join a different time line. Optionally, the method includes allowing an unlimited number of time lines at one time for different participants. Alternatively, the method includes allowing only a limited number of time lines at one time for different participants.

Optionally, at least one of the participants is a presenter and wherein the presenter operates according to a time line, delayed relative to the time line of other participants, to allow the presenter time to interact with other participants without slowing down the rate of information presentation. Optionally, controlling the rate comprises using the participants as a computational resource to reduce the amount of presented information. Optionally, using the participants as a resource comprises using rankings of elements of the event provided by the participants.

Optionally, the ranking is explicit by the participants. Alternatively or additionally, the ranking is implicit by the actions of the participants. Optionally, using the participants as a resource comprises using participants to answer questions raised by other participants, to drop questions raised by other participants and/or to prevent misuse of the event.

Optionally, controlling the rate of information presentation comprises reducing a rate of information presentation to a presenter of the event. Optionally, the reducing comprises providing feedback to the presenter. Optionally, the feedback comprises at least one of an indication of points in the time line that slow participants the most, questions that have large group followings, polarization and fractionalization of the participants, statistics of content-related and unrelated messages between participants, number of interacting participants, number of questions that are not joined by a certain number of participants or by participants of different groups and ranking of at least one of questions, discussions and answers.

Optionally, the feedback comprises at least one statistic of feedback from at least a sample of the participants. Optionally, the feedback is provided continuously to the presenter. Optionally, the feedback includes open-ended feedback sentences. Optionally, the method includes offering a participant the option of joining a free-text feedback response of a different participant.

Optionally, controlling the rate of information presentation comprises filtering presented information based on ranking of the information. Optionally, the ranking is a scalar value or a vector of values. Optionally, the filtering comprises automatically modifying the filtering to achieve a desired presentation rate. Optionally, the filtering is performed at a private computing station associated with a participant. Alternatively or additionally, the filtering is performed at a central computing station not associated with a single participant. Optionally, the filtering comprises filtering based on an association of the participant to a group of participants. Optionally, the filtering comprises automatically selecting whether to expose a participant to a question. In some embodiments of the invention, the filtering comprises keyword based filtering, subject based filtering and/or ranking based filtering.

Optionally, controlling the rate of information presentation comprises restructuring the presentation to better suit assimilation abilities of the participant. In some embodiments of the invention, restructuring comprises reordering presented information to reduce interruptions during an attending of a subject by a participant and/or to form a series of segments, each segment having a single subject.

Optionally, controlling the rate comprises maintaining at least a minimum rate of interaction between participants. Optionally, maintaining at least a minimum rate comprises injecting questions by a controller of the event. Optionally, controlling the rate of information presentation comprises causing a reduction in the propagation of information between participants. Optionally, the reduction in propagation does not reduce an interactivity level of the event, as felt by the participants.

In an exemplary embodiment of the invention, the method comprises exposing a new item of information to at least a minimum number of participants, to ensure a useful exposure of the item. Optionally, said useful exposure comprises an exposure sufficient to provide a meaningful ranking of said item, said ranking being used for a decision on further exposure of said item. Optionally, said meaningful ranking comprises a statistically meaningful ranking.

Alternatively or additionally, said useful exposure comprises exposing said item to a varied set of participants. Alternatively or additionally, said useful exposure comprises exposing said item to at least one leading participant, which participant has a greater authority than other of said participants.

In an exemplary embodiment of the invention, the method comprises trading off said controlling of exposure rate and said exposing to a minimum number of participants, to achieve a desired perceived level of interactivity.

In an exemplary embodiment of the invention, the method includes generating an ad-hoc group of participants to which a question is exposed, to limit a propagation of the question, at least at a first stage, to the group. In some embodiments of the invention, the group is dissolved after the question is answered.

Optionally, the method includes splitting the group to control an information presentation rate to members of the group. Optionally, the method includes encouraging a participant to join an existing question rather than creating a new question. Optionally, the encouraging comprises exposing questions to participants that are expected to be interested in the question and offering the that participants join the question. In some embodiments of the invention, the questions are presented in a structure suitable for locating a question of interest by a participant. Optionally, the questions are organized by subject and/or according to a structure of the event. Alternatively or additionally, the questions are organized to a presentation material prepared for the event. Optionally, the questions are associated with a search engine for search the questions.

Optionally, at least one of the questions is generated during the event. Optionally, at least one of the questions is generated during a previous event. Optionally, the method includes selective propagation of participant-generated content generated within the group to outside of the group. Optionally, the propagation is according to a hierarchical organization of the participants. Optionally, a presenter of the event, that generates a main line of the event, is included in the hierarchy. Optionally, the method includes controlling at least one of a damping rate and propagation distances of participant generated content. Optionally, the method includes imposing a structure on the event, which structure reduces opportunities for proliferation of information.

Optionally, organizing the event comprises structuring a question and answer session to match one of a limited number of templates. Optionally, the method includes increasing an effectiveness of propagated information.

Optionally, increasing an effectiveness of propagation of information comprises selecting information for propagation based on ranking by other participants. Alternatively or additionally, increasing an effectiveness of propagation of information comprises grouping the participants into groups having a participant mix that encourages useful interaction. Optionally, the mix includes at least one participant expected to be able to correctly answer a posed question and/or to moderate a discussion in the group. Alternatively or additionally, the mix is selected to statistically represent the plurality of participants.

Optionally, the event comprises one of a lecture, an entertainment event, an e-learning session, sales meeting, training session, product launch, product focus group meeting, corporate lecture, conference, stockholder's meeting and help desk.

Optionally, the method includes analyzing the interactions between the participants to extract information about at least one of the participants. Optionally, the information about participants comprises an identification of participants having desirable personal qualities and/or qualified to answer questions. Optionally, the method includes analyzing the interactions between the participants to extract information about the event. In some embodiments of the invention, the extracted information comprises ordered discussion threads.

There is further provided in accordance with an embodiment of the present invention, a method of at least partly optimizing discussion groups, comprising providing an issue to be discussed and automatically peopling a group comprising at least four participants, by a computer, for the discussion, responsive to the issue.

Optionally, the peopling comprises initially peopling the group with participants. Optionally, peopling comprises maintaining a peopling of the group. Alternatively or additionally, peopling comprises modifying a peopling of the group to achieve a desired effect.

In some embodiments of the invention, the modifying comprises modifying responsive to existing group dynamics.

There is further provided in accordance with an embodiment of the present invention, a method of dealing with questions in an on-going synchronous event that includes a plurality of participants that raise questions and expect answers, comprising accumulating questions and answers in a previous event, and providing the accumulated question and answers as a database of answers of a current event.

Optionally, the method includes manually editing the accumulation between the events.

Optionally, the accumulation is indexed to a time line of the event.

There is further provided in accordance with an embodiment of the present invention, a method of managing an on-going interactive event, comprising detecting an interaction dynamics of the event and modifying at least one parameter of interaction between participants to control the dynamics.

Optionally, the modifying comprises injecting a question and automatically creating a group, by a computer, linking a plurality of the participants to discuss the question. Optionally, the modifying comprises modifying a propagation characteristic of participant-generated content in the event. Optionally, the modifying comprises damping propagation content generated by a particular participant. Optionally, the modifying comprises modifying an automatic grouping characteristic in the event.

There is further provided in accordance with an embodiment of the present invention, a method of providing feedback from a large audience of participants to a presenter, during an event comprising collecting statistics regarding the interaction of the participants with the event, and displaying the statistics to the presenter.

Optionally, the statistics relate to interaction between participants, to ranking of participant-generated content by the participants and/or to rate of information assimilation by the participants.

There is further provided in accordance with an embodiment of the present invention, a method of providing a balanced presentation, comprising providing a main event presented by at least one presenter, providing an ongoing commentary channel associated with the event and providing commentary on the presentation, and providing means for a plurality of participants in the event to discuss the main event and the commentary with each other.

There is further provided in accordance with an embodiment of the present invention, a method of question management in a system having a large plurality of participants, comprising receiving a suggested question, automatically determining whether to expose the question to one or more participants, automatically selecting a plurality of participants to whom the question is to be exposed, at least one of the participant not being expected to answer the question, automatically exposing the question to the selected participants, and repeating the automatically determining, selecting and exposing to achieve a desired question exposure.

Optionally, the automatically selecting comprises automatically selecting participants responsive to an event time line associated with each participant. Optionally, the exposing comprises forcing a discussion of the question to have a fixed organization. Optionally, selecting comprises selecting participants that are expected to have free attention resources for considering the question. Optionally, the desired question exposure comprises an exposure to a statistical representation of the large plurality of participants.

There is also provided in accordance with an exemplary embodiment of the invention, apparatus for carrying out a method as described herein, comprising a computer and a memory storing therein software for programming said computer.

BRIEF DESCRIPTION OF THE FIGURES

Particular, non-limiting embodiments of the invention will be described with reference to the following description of embodiments, in conjunction with the figures. The figures are generally not shown to scale and any measurements are only meant to be exemplary and not necessarily limiting. In the figures, identical structures, elements or parts which appear in more than one figure are optionally labeled with a same or similar number in all the figures in which they appear, in which:

FIG. 5A is a time line chart of an exemplary main event, showing multiple virtual times in accordance with an embodiment of the present invention;

FIG. 5B is a time rate chart of an exemplary main event, showing multiple virtual times progression rates, in accordance with an embodiment of the present invention;

FIG. 5C is a content chart of an exemplary main event, showing multiple content lines in accordance with an embodiment of the present invention;

DETAILED DESCRIPTION OF EXEMPLARY EMBODIMENTS

Overview

Figure 1:
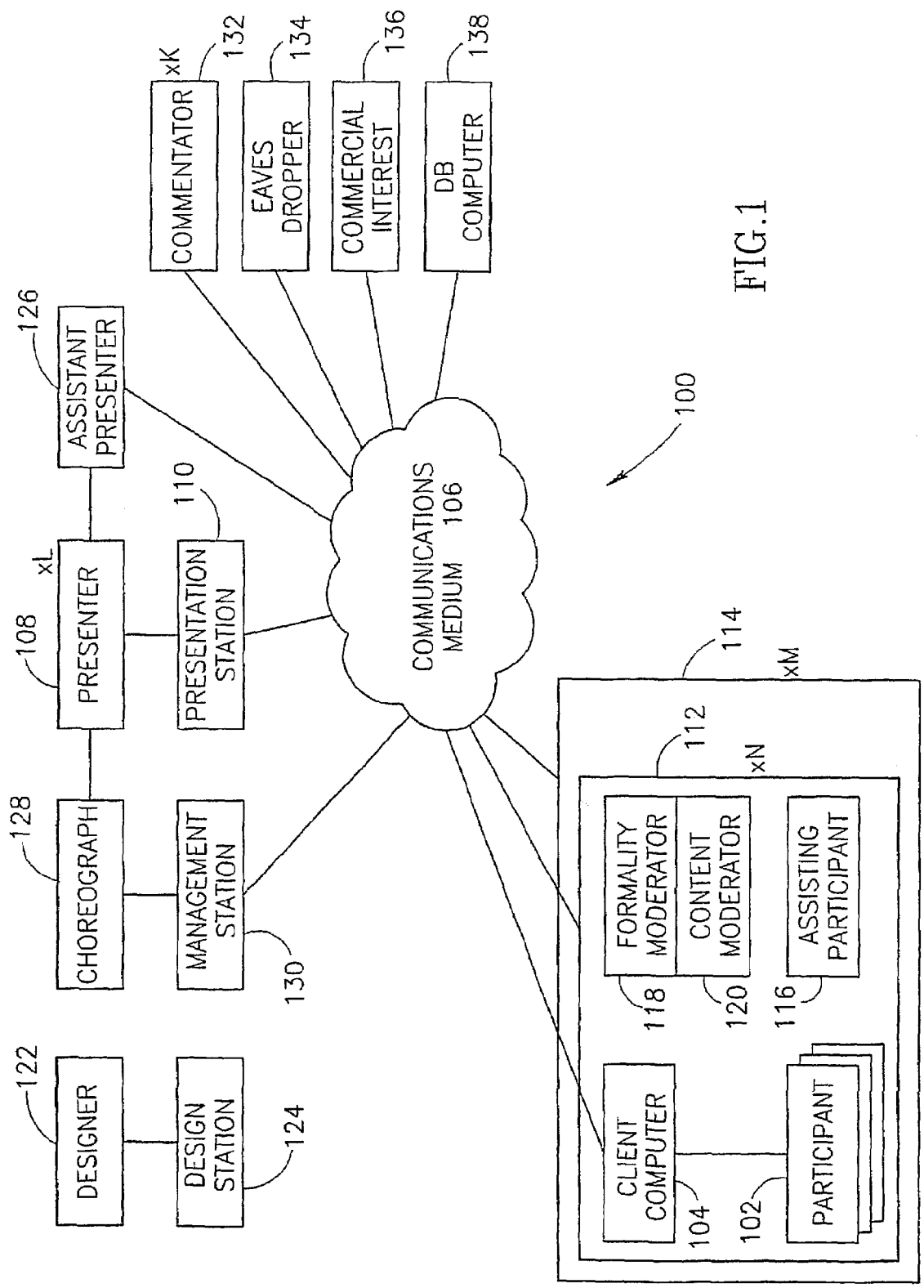
FIG. 1 is a generalized block diagram of a large group interaction situation, in accordance with an embodiment of the invention.

A large group Internet interaction event in accordance with some embodiments of the invention, typically includes a single (or small number of presenters) and a very large number of participants, for example, 100, 1,000, 10,000, 1,000,000 or even 1,000,000,000. As will be described below, in other embodiments of the invention, the number of presenters can be greater than one, for example between 2 and 10 or even be quite large, such as 100, 1,000 or 1,000,000. Exemplary events are lectures, live media events, and other events, such as described below in an "applications" section. Both live events and recording-based events are supported by some embodiments of the invention. In both event types, as will be described below, different participants may experience different time lines, in accordance with some embodiments of the invention, while still maintaining a meaningful relationship with the rest of the large group.

In a typical large group interaction event, the participants may or may not be interested in contact with each other. In some embodiments of the invention, for example as detailed below, additional actors/functionaries are defined in the interaction, for example, choreographs and moderators, to assist in managing the interaction and/or in other aspects of the interaction. Alternatively or additionally, in some embodiments of the invention, the participants are arranged in groups.

In a large interaction, more information is generally provided than can be assimilated by a participant. One example of a measure of the amount of information that can be assimilated by a participant is the number of words that can be read per minute. Assuming an average participant can read 250 words per minute, and assuming an average participant generates one ten word sentence per 10 minutes, any event with over 250 average participants will include more information than can be assimilated by the average participant, degrading the participation quality and/or disrupting the event. One solution provided in accordance with some embodiments of the invention, is to structure the event into groups of participants, each group including a relatively small number of participants, such as between 10 and 50, so that the participants can assimilate all the local information and still have some attention/time available for content from outside their group. An average word may be assumed, for example, a five letter word.

The number of participants suggested above as a limit for a "standard" synchronous interaction is generous, given the following factors typical of real interactions: the content is on more than one subject, the content is new, the participant is being interrupted, the content is provided in non-uniform language, terms and often using bad grammar, the content is being presented from multiple view-points, there are side issues (e.g., conversations with friends) and the participant may not be paying fill attention to the content and the participant may be slow in assimilating some content, requiring time to think about new content.

Main Interaction Objects/Actors/Functionaries

FIG. 1 is a generalized block diagram of a large group interaction event 100, in accordance with an embodiment of the invention. It should be noted that not all interaction events in accordance with some embodiments of the invention will include all of the different actors detailed in FIG. 1 and the following description. Further, in some embodiments, the functions of two actors may be merged and/or the functions of a single actor maybe spilt between two actors. Some specific examples of such merges and splits will also be described below.

Interaction event 100 comprises a plurality of participants 102, each of which uses a client computer 104 (or other electronic device) to connect to a communication medium 106. This media is optionally the Internet or a comparable computer communication network, however, as will be described below, other network types are supported as well. Participants are optionally organized in one or more groups 112, which may themselves be organized in meta-groups 114. A group 112 (or a meta-group 114) may include other actors, for example an assisting participant 116, a formalities moderator 118 and a content moderator 120.

A significant portion of the information in an interaction event is possibly provided by one or more presenters 108 (e.g., a panel), each using a presentation station 110. A presenter may be assisted by an assistant presenter 126. The event itself may be designed by a designer 122, using a design station 124. The real-time control of the presentation may be performed by presenter 108, however a dedicated choreographer 128 with a management station 130, is optionally provided.

Alternatively or additionally to a presenter 108 that provides an information stream, one or more commentators 132 may be provided, for commenting on the information provided by the presenter and/or by the participants.

One or more eavesdroppers 134 may track the interaction event, for various reasons, described below.

One or more commercial entities 136 optionally participate in the interaction, for example as described below.

A database computer 138 is optionally used to store information that can assist the current and future interaction events, as described below.

Each of the above actors will now be described in detail. It is noted that many of the actors can be implemented as computer software, alternatively to them being human. Even human actors optionally, but not necessarily, use special software to carry out their tasks.

Presenter

Presenter 108 is optionally a live presenter, for example a lecturer. However, in some embodiments of the invention, the presentation is previously recorded, so the presenter is actually a recording, possibly with one or more human operators. In some types of events, the presenter generates a main event information line and a main event time line (if they exist), which serve to synchronize all the other actors and allow them to interact in a meaningful manner. Typically, all the participants accept information from the presenter, for example, at least 20%, 40%, 60%, 80% or any smaller, larger or intermediate percentage of the presenter's output. This output, can serve, for example, as 20%, 40%, 60%, 80% or any smaller, larger or intermediate percentage of the total information assimilated by a participant during an event. One of the presenter's tasks is to modify the information line and/or the time line in a way that will optimize the reception of information and/or pleasure of the audience. Other parameters may be optimized as well. The presenter may also generate subsidiary information lines and time lines, for the use of specific sub-groups in the audience. The presenter may also be required to manage the interaction. Some of these "presenter" tasks may be assisted by a presentation station 110, described next, or by human operators, such as assistant presenter 126 and choreographer 128.

Presentation Station

An exemplary catalog of tools for presentation station 110 is described below. Generally, however, station 110 will include means for capturing the presenter's image, voice and/or blackboard, slide showing tools and/or other tools for providing an information stream to communication medium 106.

In addition, presentation station 110 optionally includes means for providing feedback to the lecturer regarding the information stream and/or the time stream. As will be described below, such feedback can include explicit feedback, such as a request to slow down or a particular information query. Alternatively or additionally, such feedback can include implicit feedback, for example illustrating the general level of difficulty participants are having, or the general degree of interest.

Assistant Presenter

Assistant presenter 126 can assist presenter 108 in any of his myriad of tasks. However, assistant 126 may be especially helpful in preventing the interruption of the presenter's line of thought. Thus, assistant 126 can organize the content side of the interaction. In one example, assistant 126 organizes information and participants' questions for preview by presenter 108. Alternatively or additionally, assistant 126 can deal directly with many questions that arise, so they never reach the presenter's attention. In events where presenter 108 is a panel, assistant 126 can help organize the panel and possibly mediate interactions between the panel members. In some embodiments, more than one assistant presenter is provided. Optionally, the presenter's assistants are organized in an ad-hoc group structure, as described below, for the purpose of assisting in managing the event.

Event Plan and Changes

Event 100 is optionally run according to a plan. In an embodiment of the invention, the plan takes into account changes that may be required in its execution. In FIG. 1, the event plan is shown as being designed by designer 122 using a design station 124. The execution of the plan is monitored by presenter 108 and/or a choreographer 128, using a management station 130.

Planning of events may use any planning tools known in the art. Optionally, design station 124 includes a simulation tool, for simulating the interactions between participants and their possible effects on the event progression.

As will be described below, there are various types of feedback which can be provided to station 130. One class of feedback relates to the time synchronization of the participants with the presenter. Another class of feedback relates to meeting the various types of goal set up in the plan. Alternatively or additionally, to presenting feedback, management station 130 can also be used to vary various parameters of the event, thereby affecting its course. Such parameters may relate, for example, to the creation of groups, percolation of questions and/or responsibility and abilities of various actors.

Other events may be performed without a preconceived plan. However, even such an event optionally, but not necessarily, is associated with a partial plan having one or more of a collection of event segments, goals and expected problems.

Participants

In some interactions, the most important actors are participants 102. As will be shown in particular examples below, the participants may have previous associations between themselves, however, this is not required. Many participants are simply passive listeners. In an embodiment of the invention, however, at least some of the participants are active, for example asking and/or answering questions, ranking information and actors, providing direct or indirect feedback to presenter 108 and/or interacting with others of the actors of event 100. In some cases, active participants may raise to the level of assisting participates, which take over some of the responsibilities and/or functions of non-participants, for example various types of moderation.

The sum of all the participants may be modeled as a virtual person or audience. This model may be especially useful for presenting feedback to presenter 108. In some cases, a group of participants will be modeled as a single virtual participant, so that an audience comprising of a mixture of real and virtual participants (or only virtual participants) may be presented to the presenter and/or to other participants.

The real participants may not be visible to the other participants and/or actors. Instead, a real participant may be encapsulated or represented by a virtual personality, which can include, for example, a face, association rules and fields of interest.

Client Station

A fully featured client station 104, typically a computer, for a participant is described below. However, it should be noted that the level of sophistication of the client station depends on the participant interaction level and on the type of event. Thus, in some situations, a cellular telephone with a three line display may serve as a suitable client station, for example with the information arriving by audio, the keypad serving to control the participants perception of the event (e.g., time line and content filtering) and a text messaging tool used for communicating questions and other information with other participants.

Ad-hoc Groups

A feature of some embodiments of the invention is the ad-hoc association of participants into groups. Such groups are optionally formed in response to the instantaneous common interest of the participants. This interest may be manually indicated by the participant, for example by them expressing interest in a same question or subject. Alternatively, a common interest and/or treatment may be determined indirectly from the participants behavior, for example, if two participants enact a substantially similar time line, it may be assumed the two participants have similar understanding problems and/or interest, so participation in a group might be offered to the participants. Alternatively, one of the other actors may add or recommend adding a participant to a group. This adding may be, for example, by selecting the participants as individuals or by describing a profile, e.g., native language, such that all participants matching the profile are added to a particular group. Alternatively, a script for grouping participants may be defined to analyze the actors space and generate groupings.

It should be noted that a single participant may belong to a plurality of independent groups at a same time. It should also be noted that other actors can also be assembled into groups, especially if their numbers increase, for example, all moderators that have a similar leadership problem may be grouped in an add-hoc group addressed by the choreographer, in which the choreographer provides some insight into dealing with the problem. Also, all potential moderators may receive a special indoctrination prior to the event, in a pre-event interaction.

The groups may be themselves grouped, into super groups. More than one hierarchy level may be provided. Further, inheritance behavior, as known in other object oriented hierarchies, maybe described between groups and/or actors, for example based on the group history, characteristics of the participants of the group, or manually, for example by a moderator. Thus, for example, a super-group may be marked as receiving extra information, which other super-groups do not receive, which information is processed and/or filtered before being provided to the constituting groups, each constituting group receiving different information. Such processing may be performed at various locations, for example at a group moderator 118 or 120 of the constituting group or by choreographer 128.

Alternatively or additionally to ad-hoc groups, participants may be pre-grouped, for example, based on country of origin, user profile, participants' requested grouping and/or other considerations.

A group of participants can be managed in several ways. A first way is not to have any special individuals, all participants having the same basic rights. Some participants may have greater (or lesser) rights, for example due to them having a recorded level of experience, education or ranking. A second management method is to have a single participant who is a group leader and who monitors and/or controls all aspects of the intra-group interaction and optionally also inter-group interactions in which the group takes part. A third management method is to allocate different participants or other actors for different tasks, for example for dealing with formal problems such as trouble makers or for dealing with content problems, such as informational queries. Exemplary such actors are moderators, which may have not only special ability inside a group, but also a special communication line or priority when communicating with presenter 108 or one of his assistants.

One of the functions of the moderators, in some embodiments of the invention, is to form a control skeleton, for controlling the interaction event, both with regard to its progression and with regard to flow of information. Instead of communicating with 1,000,000 participants, a presenter 108 can, in some case, communicate with only a few hundred or thousands of moderators, which may themselves be organized in a hierarchy. Each such moderator can represent one or more groups, a plurality of moderators can represent a single group or a moderator may be completely independent of group designations. Such an independent moderator may be assigned (e.g., by choreographer 128) to a group when it is created or based on need.

A group is, for some purposes, an atomic unit of the interaction process, in that the group may be dealt with as a single unit. Conversely, the group may solve some of its own problems, for example, one group member answering questions posed by other participants of the group.

It should be noted that in some embodiments of the invention, a "group" is not a closed set of participants, rather, each participant has an associated set of participants with which he can interact. If these sets are the same, the result is a closed group. If, however, the sets do not exactly overlap, each participant experiences a different "group". In either case, the propagation of questions and answers is limited.

Formalities Moderator

One optional type of moderator that may be useful is a formalities moderator 118. This moderator deals with formalities, not with content. The job of the moderator may include, for example:

(a) identifying and punishing trouble makers;

(b) monitoring the relative load on actors in the group;

(c) allow or force the group size to change, for example responsive to the question rate or the answer rate;

(d) forward formality problems to choreographer 128;

(e) set group policy, such as allowed question length, response time limitations and language limitations; and/or (f) assisting participants, for example with regard to payments and lecture prerequisite knowledge.

Content Moderators

Another optional type of moderator is a content moderator 120, who is in charge of the information flow inside the group and between groups. For example, such a content moderator can:

(a) edit questions to conform to common terminology;

(b) explain complex technical terms;

(c) answer some questions; and/or (d) decide if a question should be forwarded to a different group or individual.

Both types of moderators may be predetermined, for example, when producing the event. However, a particular feature of some embodiments of the invention is that a participant can turn into a moderator and/or a group leader. As will be explained below, in some cases, a participant can even become a presenter. Typically, the changing in roles of a participant is mediated by the participator answering questions and/or entering rankings and/or based on the rankings that questions and/or answers he prepares, are given. Alternatively or additionally, an analysis of the message flows or other interaction between participants may be used to identify individuals more suited to become assisting participants. The task of assisting may be, for example, offered to these identified individuals or it may be forced on them, for example, a question originator may automatically become a moderator for the group formed for his question.

Main vs. Secondary Channels

Generally, the presenter generates what is considered the main channel for content. Such a channel can include a plurality of actual information streams, for example, audio, video, animation, text and graphics, each of which may have a separately manipulated time line. Additionally to the main channel, one or more secondary channels may be provided. In extreme cases, only a plurality of secondary channels are provided and there is no main channel. In one example, if a panel of experts is discussing a subject, each one of the experts is a presenter, but none of them is a main presenter. In this example, a chairman may be the main channel, and remain silent most of the time, or only provides comments and/or connecting remarks on the presenters. A participant may then be tuned into two channels at a same time, the chairman and his desired presenter.

Optionally, a channel synchronization tool is provided to a participant, for example to match the time line of a main channel with that of one or more associated secondary channel. In some cases, an important occurrence in one channel with automatically (or manually, in response to a user's instruction) cause one channel to be delayed or advanced to match a second channel. Such synchronization may also be useful when playing back a channel, with associated relevant channels (possibly even if they were not originally viewed). The association between channels may be, for example manual by the participant, entered by a moderator, by a generator of the secondary channel or implicit when the two channels both relate to a same stream of occurrences, for example a basketball game. Some events, such as an excellent shot may be identified as an event that has a location in the time lines of both channels.

Commentary Channel

One type of secondary channel is a commentary channel. This channel is used to criticize, provide support and/or provide background on information being presented in the main channel. It is not required that all the presentation channels be live. For example, the main channel may be recorded, and the commentary may be live. Alternatively, the main channel is live and the commentary is retrieved from a recording, responsive to bookmarks that are indicated by the presenter, for example. Alternatively, both the main and at least some of the secondary channels are recorded.

Eavesdroppers

The interaction between the participants, the presenter and all the other actors can provide a wide variety of useful information, for example, an identification of social cliques and an identification of subjects of interest suitable for targeted advertising and/or merchandising. In an embodiment of the invention, one or more eavesdroppers 134 analyses the interactions and/or information flow. Alternatively, the interactions and/or information flow may be recorded and then analyzed off line.

Exemplary eavesdroppers include:

(a) A publisher that prepares a textbook based on the flow of a live lecture series.

(b) An advertiser, that presents advertising during the interaction event or after the event.

(c) Recruiters searching for new talent or desirous of evaluating potential workers.

Commercial Interest

Another actor is a commercial interest 136, which may, for example subsidize the interaction event. In return, such a commercial interest may act as an eavesdropper and, based on the interaction particulars, push merchandise to the participants, for example, textbooks, services and music CDs.

Functional Integration of Actors

In an embodiment of the invention, one or more of the techniques described below is used to allow the large number of participants and other actors to interact. The set of techniques, hardware and software used to implement the methods is described herein as a "system", which can be distributed or centralized, using various computer architectures. Each method can be selected to assist in one or more typical problematic features of large interactions:

(a) Inter-participant variations, both with regard to interest and with regard to abilities.

(b) Information overflow and underflow.

(c) Lack of feeling connected to the rest of the participants.

(d) Lack of personalized questions and answers.

Question Exposure

Question propagation is spilt in the following description into two related functions, the maintenance of ad-hoc groups and propagation of questions inside groups or between groups and participants.

Figure 2:
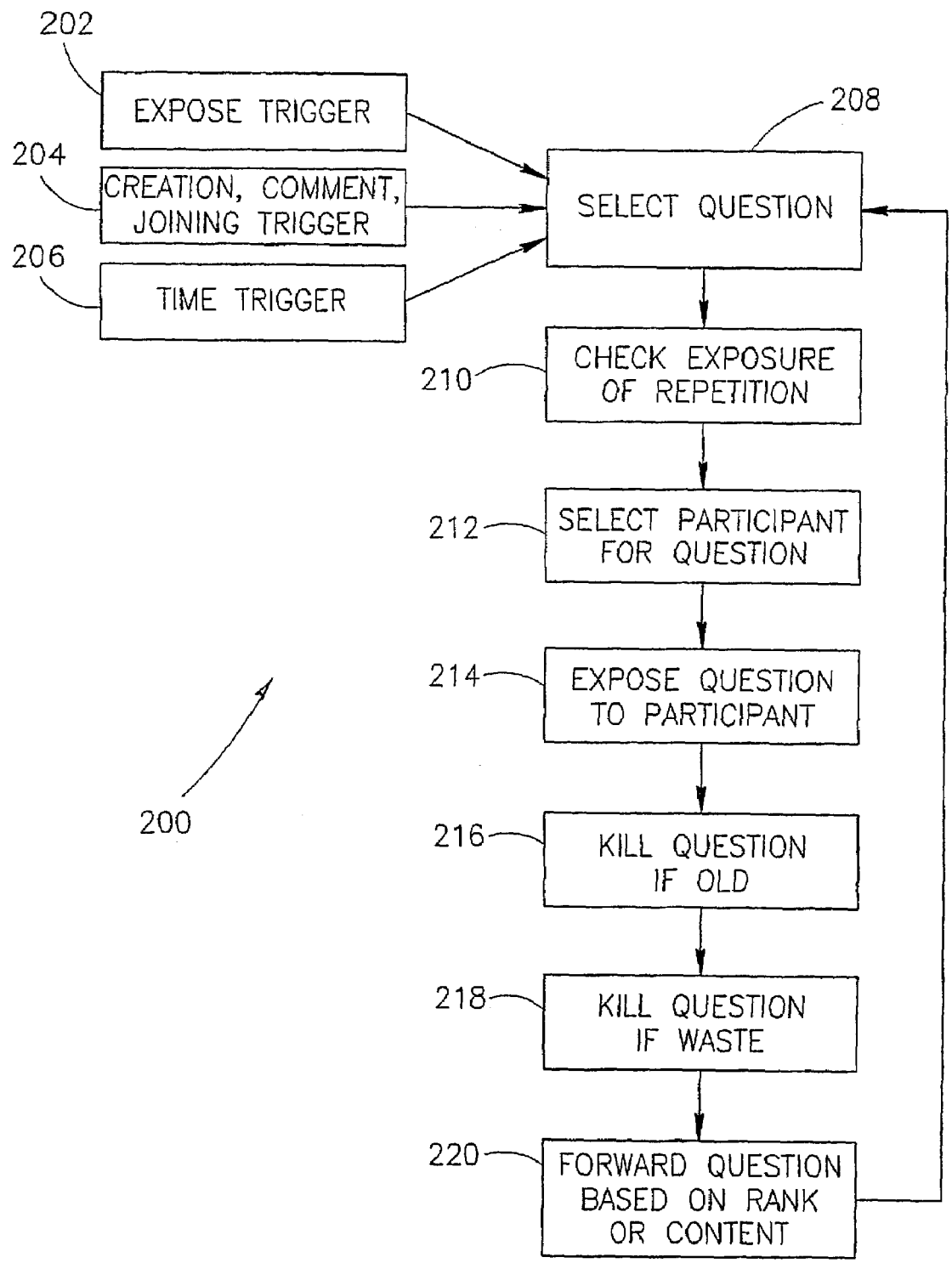
FIG. 2 is a schematic flowchart of a method of question propagation, in accordance with an embodiment of the invention.

FIG. 2 is a flowchart 200 of a method of question propagation, in accordance with an exemplary embodiment of the invention. In this particular implementation, one or more of the following aims is possibly achieved: fast response to participant questions, providing an optimal exposure level of the question to participants that want/should have exposure and forwarding the question to higher-level actors (such as presenter 108) when relevant. The method is described in a centralized manner. However, in some embodiments, the implementation may be distributed, for example the questions being propagated geographically.

At 208, a question is selected for propagation. The selection may be based on a loop, for example a timed loop. Alternatively or additionally, various triggers may be used to prompt a particular question for selection. Alternatively, a question may be selected for propagation based on the number of available questions for propagation. This number may be global for the entire system or it may be local (logical locality or spatial locality) for various groups or sub-groups of participants or other actors. It should be noted that a question object can include not only the question itself and its ranking, but also possibly, the questions' rank, comment(s) and/or answer(s) to the question and/or their rank. In some events a question may form as a general request from information/clarification or presentation of opinion, and not only a straight-forward question to be answered. As noted below, in some situations, a question may be created complete with a short list of allowed alternative answers and/or comments.

In FIG. 2, three possible exemplary triggers are shown:

(a) An exposure trigger 202, which generates an alarm if a question is under-exposed or over-exposed (i.e., how many participants received, viewed and/or interacted with the question). This can indicate a question is not being dealt with properly or that participants are ignoring it. The level of exposure may be checked periodically.

(b) A creation, comment and/or joining trigger (204). This trigger is activated when a participant creates a question, comments on the question or decides to join it. This can indicate interest in a question, but it also may indicate a change in level of exposure of the question.

(c) A time trigger (206). Periodically, the status of a question can be checked and/or updated, for example by applying the method of FIG. 2.

Other possible exemplary triggers include a change in status or interest of a participant or an occurrence in the main event, which may affect participants' receptivity to questions.

At 210, the overall exposure of the question can be checked, as can be the number of times the question was independently created.

At 212 the question can be matched with a participant. In some cases, the matching may have a purpose of receiving a response from the participants. In others, the participant might find the question and/or answer of interest. Alternatively, a participant may browse a catalog of questions and select a question to be exposed to. This selection may use filtering methods and criteria, for example as described below. Various matching criteria may be used, for example one or more of:

(a) time line correspondence;
(b) expected ability and/or desire to answer;
(c) professed interest in similar questions (or answers);
(d) lack of exposure to questions and/or a perceived need for exposure to question;
(e) matching of language and/or previous interest in questions with the originator of the current question;
(f) estimated load on participant;
(g) being the same as or based on that used by a different participant, for example a friend of the participant, that already joined a particular group;
(h) cost, e.g., credits given to the participant; and/or
(i) desired participation level. This level may be set for a participant, for example by the participant or by other actors.

The question may then be exposed to a particular participant(s) (214) or not Optionally, a pool of participants is maintained and at 212 the participant is selected from that pool. As described, the matching and exposure design is performed serially. This may be done, for example, using a greedy-type algorithm that selects the best match of a question and a participant from the available pools. Such a greedy algorithm possibly takes into account (e.g., minimizing) a cost of presenting the question. However, other algorithms may be used as well, for example, a first-come/first-serve algorithm.

Alternatively or additionally, to exposing the question to one or more participants, the question may be retracted from some or all participants. In one example, a question may be retracted from a participant with too many questions, of a higher interest level than the current question. This mechanism can be used to emulate a participant losing interest in a question. Such emulation may be required, since a participant may not actively indicate that he has lost interest, but such loss of interest may be inferred from his actions, lack of actions or activities related to other questions.

Optionally at 216, old questions are retracted, either from some participants or from all participants. A particular participant may define a filter setting that cause old questions, low ranking questions or questions without satisfactory answers to disappear from the participant's (or others) view. Possibly, before such questions disappear, a warning is provided to the participant. Such a filter agent may be, for example, implemented locally at the participant or more centrally, as part of the interaction system.

Optionally at 218, questions that waste resources, for example repetitious questions, those causing extensive argument or those marked as wasteful by a person of authority (e.g., a moderator or presenter), are retracted.

In an optional act 220, a question may be forwarded to a higher level actor, for example a group moderator or a presenter. In some embodiments, such forwarding may be performed manually at any time. Alternatively or additionally, such forwarding is performed automatically, for example based on its rank and/or its content. A presenter or other actor, such as a participant, may define a filter for the type of questions they desire to be exposed to. Alternatively, a question may be forwarded based on the actors designated duty, for example, a question with a high enough ranking is forwarded to the presenter. One exemplary way of determining if a question is of interest is by combining the question ranking (described below) and the answer ranking. If a question has a high rank and the answers to it have a low rank, then the question is forwarded to a higher level actor.

In one embodiment of the invention, the presenter can select particular questions to form a question-skeleton of the event. Thus, when participants interact with the event, they can choose the set of questions as representative of one way of interaction. Alternatively, a plurality of question sets may be created, by the presenter and/or by other actors. Each such set can have a different slant on the event, and as such, even identical questions may be associated with different answers and/or comments (or different weights and/or orders for these answers and/or comments) in different question sets.

In some embodiments of the invention, the propagation of questions is related to the propagation of answers. A single question may receive a plurality of answers, one or more of which may be correct and one or more of which may be incorrect. In an exemplary embodiment of the invention, not all the answers are propagated to all the question-viewers. For example, the answers may be propagated based on their ranking, content, geographical or group origination or slant. As noted above, a participant may have a filter agent that makes sure that the participant is not inundated with too much material.

It should be noted that a question can disappear from a participants view, for example by being retracted or by the question being regulated for off-line (non-real time) discussion or answering. Such regulation may be performed, for example, by a moderator, a presenter, by a question originator, by another actor with suitable authority and/or by the effect of ranking or request from a large plurality of participants.

Ignoring, Creating, Joining, Answering and Leaving a Question

Figure 3:
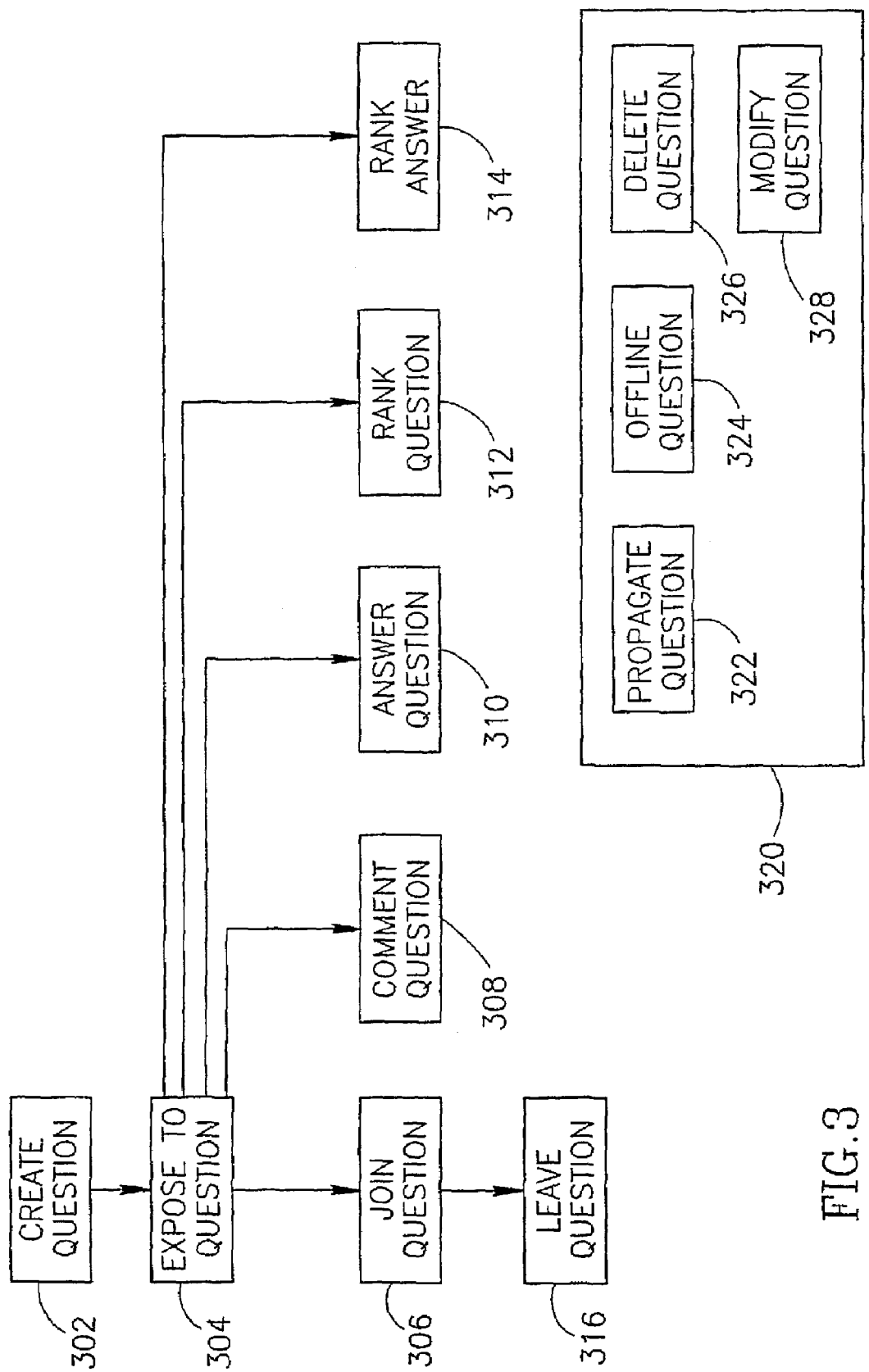
FIG. 3 is a flowchart showing various activities that may be performed in connection with the exposure to a question, in accordance with some embodiments of the invention.

FIG. 3 is a flowchart 300 showing various activities that may be performed in connection with an exposure to a question (304), in accordance with some embodiments of the invention.

Alternative to being exposed to a question by the system, a participant may be exposed to a question (304) by virtue of creating that question (302). Exposure to a question (304) can be both a momentary activity and an ongoing occurrence. For example, the first time the question comes up, the event of being exposed occurred. Following that time, until the question disappears from the participant's focus, the participant may be continuously exposed to the question. In order to conserve screen space, the question itself may be hidden, with only an icon remaining to indicate changes in the question status. Such changes can be absolute, e.g., the question is answered, or relative, e.g., the relative match to the participants' interest/time line changed. Different types of changes may cause different behavior of the icon, for example, causing the question to appear when it is new and causing a counter on the icon to be updated when participants join or leave the question. Alternatively or additionally to the icon representing a single question, the icon may represent a set of questions, for example a subject-tree based arrangement of the set.

When a participant (and/or other actor, such as a presenter or moderator) is exposed to a question, the participant may optionally be exposed to one or more of:

(a) suggested answers;
(b) comments;
(c) rankings;
(d) join rate, number and profile;
(e) question propagation profile; and/or
(f) information relating to other participants that joined the question, for example, their number, identification, an average profile, time line, and/or slide or other content related to the generation of or joining to the question.

In some cases, the participant may be asked to become active or passive with regard to the question, for example to maintain a desired level of discussion.

In this and/or other information presentation features of some embodiments of the invention, information presented to a person may be filtered in various ways, for example in response to a person's interests, geographical location, time line or other properties. Also, an actor can request to receive information only if it meets certain criteria, such as being generated by an actor having a certain profile. Such filtration may be, for example, automatic or may be requested by a human actor. Such filtering may, for example, change the order of information presented, the level of detail presented, the immediacy of presentation (e.g., display, icon, menu), which details are presented and/or whether the information is presented.

The content of a question and/or a question presentation can vary, for example based on system settings. In one exemplary embodiment, a question is limited to including a question, an answer, a comment and ranking(s) of any of the other elements. Alternatively, any one of the elements may be presented in multiplicity, for example, a plurality of related questions, a plurality of suggested answers, a plurality of comments and individual rankings, rather than only aggregate rankings. Alternatively or additionally, a question can include a discussion line, comprising a series of questions and answers. In some events, such a discussion line is undesirable as it may cause the participants to wander away from the main event line. However, this will not always occur and is not always a problem.

Alternatively to a series organization, questions and answer lines may be organized in a hierarchical structure, with at least some of the secondary questions causing a splitting of question thread into two threads, each with different secondary question and/or participants. Alternatively, a question line may be replicated when such a split of the discussion line occurs. The participants that are registered to the questions, may now be registered to both question lines or they may elect, be forced to elect or be removed from one of the question lines.

FIG. 3 shows various activities which may be performed on a question. A question may be joined (306). The act of joining can indicate, for example, that a participant would have liked to have originated that question. However, other types of joining can be provided, for example, joining only for the purpose of lending support (without being shown the answer later), joining only for viewing comments, and/or viewing answers and/or providing rankings.

An actor may comment on a question (308). A comment may be, for example to annotate the question or annotate an agreement with the question ("join"). Such a comment may also be helpful to the person answering the question. Alternatively or additionally, a comment may be associated with a ranking of the question and/or with an answer.

An actor may answer the question (310). It should be appreciated that not all actors may be allowed to answer questions. Furthermore, the status of a question may affect whether a particular actor can answer. For example, in some embodiments, a participant cannot register an answer after the presenter has answered.

An actor may rank a question (312), an answer (314) and/or a comment. Optionally, the ranking can include a comment. The ranking may be, for example, a real-time ranking, which can be propagated to all others viewing the question. Alternatively, the ranking may be hidden, for example being used to select group leaders and assistants and/or may be utilized only at a later time, for example after the event.

A question, an answer and/or a comment may include various types of media, including for example, text, audio, video, animation, program scripts, a link to a relevant WWW site and/or a bookmark to a portion of the main event or other information associated with the event (such as a different question or a more relevant answer).

Various tools may be provided to assist an actor with understanding a question, for example a tool that retrieves or suggests other, similar questions, either past or current.

Another action which an actor can perform is to leave a question (316). It is noted that the leave taking can be manual or automatic, for example if the time line of the question and the actor become too separated. Also other actions described herein may be, depending for example on the embodiment or on the parameter settings, manual, automatic or semi automatic, for example, the system making a suggestion or the system notifying a user that unless action is taken the system will take action.

When an actor leaves a question, the actor may still be notified, for example using a less obtrusive communication media such as e-mail, that the question was answered. Such communication may be delayed until the event proper (but maybe not the discussion groups) is over. Alternatively or additionally to leaving a question, an actor can change his level of involvement with a question, for example, being notified only when an initial answer is presented, and not every time a participant joins the question.

In some embodiments, when a question is joined, a group is defined. A moderator may be defined for the group, for example by the system selecting from a set of available moderators. Alternatively or additionally, the question creator may be automatically defined to be tie moderator.

Reference 320 indicates a group of activities which a regular participant may be restricted from performing, but which may be, for example, allowed for a moderator or other high level actors. As used herein, the "level" of an actor denotes the position of authority of the actor with regard to a presenter or an event manager. As noted below, in some cases a participant may become a presenter, so a same actor may be low-level in one respect and high level in another respect.

A question can be propagated (322), for example indirectly by changing its ranking or its content or directly, for example by being forwarded to particular actors. A moderator may change a question's ranking to an extent greater than that possible by a single vote.

A question can be regulated to a lower urgency level (324), for example to be answered off-line, rather than in real-time while the event continues.

A question can be deleted (326), for example for reasons as suggested in FIG. 2. Also, once the question creator leaves the question or if there are no participants joined in, the question may be automatically deleted.

Alternatively or additionally, a question, one of its answers and/or other properties of a question may be modified (328). In one exemplary situation, a question is modified to make it clearer. In another exemplary situation, an answer is deleted or amended to correct an error therein.

Question Propagation

Figure 4:
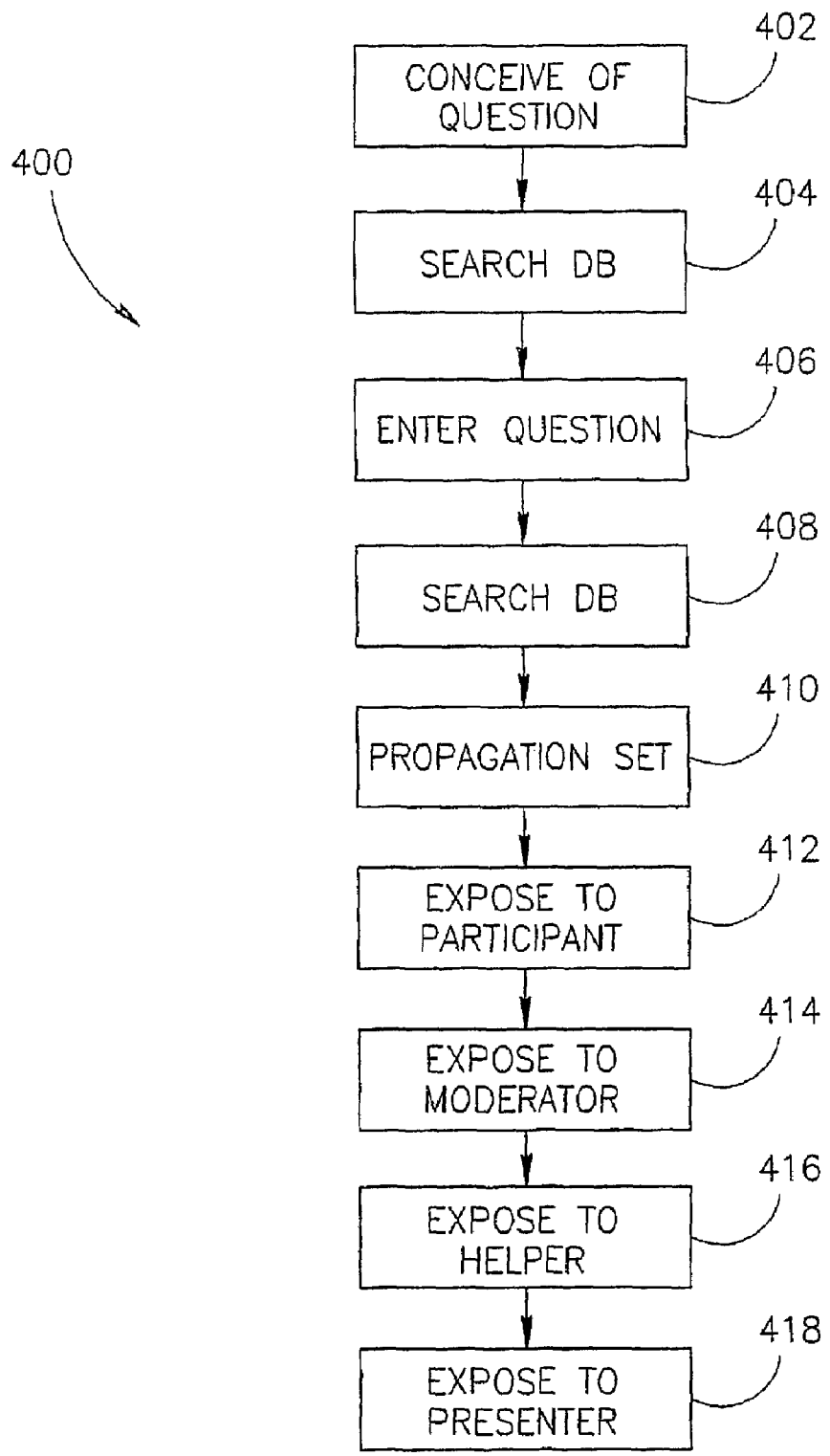
FIG. 4 is a flowchart showing an exemplary series of acts in the propagation of a question from its creator to a presenter.

FIG. 4 is a flowchart 400 showing an exemplary series of acts in the propagation of a question from its creator to a presenter.

First, a participant conceives of a question (402). Optionally, although the participant is not required to do so, the participant will search a database of current and/or previous questions (404) to see if the same or a similar question was asked and a suitable answer is available. Alternatively, a participant can revive a previously asked question, optionally with its existing answers, comments and/or ranks.

In one embodiment, the database is searched using a search engine, as known in the art, for example using keywords, for example each question and answer forming an individual WWW page. In some embodiments, the search is automatic.

In another embodiment, the questions are arranged using an index that can be browsed, for example a keyword index or a subject index. Alternatively or additionally, the questions are arranged in accordance with the time line of the event.

The participant then enters the question (406) into the system. In one embodiment, the question is entered using free text. Alternatively, the system restricts the grammatical form and/or the allowed terms. One possible result of such restriction is that comparing and searching for questions may be easier.

Optionally (408), the system searches for the existence of similar or same question. The results may be shown to the participant, to other participants or to a moderator, to assist in deciding how to address the question. Alternatively or additionally, some questions may have default properties associated with them. In one example, questions containing certain keywords are brought to the attention of various moderators or their ranking is repressed or enhanced. This special treatment of questions may be predetermined, for example to assist in the unfolding of an event by bringing certain landmark questions to the attention of the moderators or presenter. Alternatively, such special behavior may be decided ad hoc, for example by human actors, as a means of controlling the event. In an example of controlling an event, a problematic question can be blocked off by a moderator, for example by providing an answer and/or by marking the question as an old question.

Once the question is accepted, it may be propagated, e.g., exposed, for example as described above in FIG. 2 (410). The question may be exposed to a participant (412). A particular type of participant is one that is an acknowledged expert (or more expert) in the question subject. Alternatively or additionally, the question may be exposed to a moderator (414). Alternatively or additionally, the question may be exposed to a helper of the presenter (416). Alternatively or additionally, the question may be exposed to the presenter (418). Typically, the question will percolate up the hierarchy.

When the presenter receives the question, he has several choices, including, for example one or more of:

(a) ignoring the question;

(b) responding to the question with a text answer, without modifying the event;

(c) making a small digression from the event to respond to the question (e.g., verbally); and (d) modifying the event taking into account the question or an issue raised by the question.

It should be note that at any point along its percolation, the question may, and typically will, be answered, deleted, ranked, modified and/or commented on, for example as described in FIG. 3.

The hierarchy described in FIG. 4 is a logical hierarchy, which generally presumes that the higher-level actors are more likely to know how to deal with a more problematic question. In some cases however, the propagation is lateral, between participants with (optionally) increasing level of expertise in the subject matter of the question. This situation can be expected when the presenter is not an expert in the main event, while some of the participants are. Thus, a question may even percolate "down". The expertise of the participants may be pre-registered. Alternatively or additionally, the expertise level can be gleaned during the course of an event, for example, by analyzing the ranking of answers provided by such participants. Such ranking may include not only correctness, but also ease of understanding.

Ad-hoc Group Management

The group of participants registered to a question may be determined based on the desired exposure level of the question, as described in FIG. 2. Alternatively or additionally, other considerations may be applied. Such considerations can be taken into account when exposing the question to particular participants (the cost function) and/or when managing the ad-hoc groups defined by those participants having an interest in a particular question. Such a participant may be modeled as having various properties, including:

(a) content that is of interest, stored for example as subject fields, keywords or bookmarks on event sections;

(b) current focus of the participant;

(c) current time-lines of the participant and/or willingness to be spilt between different time lines and/or the number of such time lines;

(d) level of interest in a particular question;

(e) level of participation in a particular group;

(f) ranking (by peers) or scoring (by system) of the participant with respect to honesty, expertise, trouble making and/or other personality traits;

(g) number, participation level and/or identification of other ad-hoc groups the participant is affiliated with;

(h) in some types of events, the properties may carry over between events as well, or between real life and virtual events, for example in a lecture event, the properties may relate to a complete course curriculum of the participant;

(i) language;

(j) known buddies;

(k) geographic location (e.g., to support physical gathering after the event);

(l) personal information such as gender, age, and profession; and/or (m) event-related properties, such as group properties associated with questions the participant has joined or a temporal rate trajectory.

Maintaining an ad-hoc group can include, for example:

(a) adding members (exposing to the question) and accepting a join or forcing a join;

(b) removing members, for example suggesting they leave or forcing them out;

(c) partitioning or merging groups; and/or (d) identifying trends in the group and/or trouble makers.

One or more of the following exemplary criteria may be used when creating or maintaining ad-hoc groups:

(a) A desired instant exposure, e.g., the number of participants relating to the question. It is noted that different participants may define or act out different participation levels. Also, the exposure may also be defined with regard to temporal time, e.g., how many participants at any given time or time range (real time or virtual time).

(b) A desired activity level of the participant. It may be desirable to maintain at least a minimal amount of participation in ad-hoc groups for all participants. However, too high a participation level may affect the interaction with the main event. Different participants may have defined different activity parameters.

(c) A match of the content of the group discussion and the interest of the participants. In some cases, a growing polarization in the group will suggest to the moderator (or the system) splitting of the group into two or more. It is noted that such a polarization may be identified by clustering the interactions between group individuals. Often, one or a small number of focal points can be detected. If there is little direct interaction between the points, it may be desirable to split the group. Similarly, two groups that use many of the same keywords and/or related content and/or bookmarks, may be slated for joining. Such joining may be, for example, by a higher level moderator, or by the system suggesting such a joining up the two groups' moderators, if such moderators exist.

(d) A content correct blend of participants. It may be desirable for the group to include at least one participant that is expected to answer the question. Also, different participants may have personality attributes that make them interesting to be in a group with. Such participants should be spread around between groups.

(e) A socially correct mix of participants. It may be desirable that at least some ad-hoc groups last after the event is over. A participant may request to be put into groups with other participants with whom the participant would like further interaction. Parameters for such matching up may be, for example, predefined by the participants or determined by the system from the behavior of the participants and/or their associates. Alternatively, some participants will ask to be grouped together with geographically near and/or known participants, for example to facilitate the creation of and maintenance of study groups. A student (a participant of education events) may wish to interact to a great extent with his/her friends ("buddies"). Alternatively or additionally, a participant may invite other participants or recommend them to the moderator. Alternatively or additionally, a participant or moderator may ask the system to find an available participant matching a particular profile definition.

(f) Maintaining the group size at a level where the group is not too unwieldy. This is a flexible criterion, which can depend, for example, on the level of participation of the participants. If the group is too small, there will not be a lively discussion between the participants.

(g) Desired representation. For example, a group may be constructed to represent only one narrow part of the idea spectrum, to represent a wide spectrum, to include extremes and/or to statistically match the distribution of different opinions in the audience at large.

(h) Time control. Participants may be selected to have similar time lines, or to have different time lines, for example, to force an advanced participant to slow down or to assist a slow participant in catching up (e.g., the group provides the participant with in depth analysis for the "ahead" participant or a summary for the "behind" participant).

It is noted that the boundaries of a group may be somewhat fuzzy, so that in some cases and/or embodiments, fuzzy logic decision making tools may be used for group management.

As noted with reference to FIG. 1, the actual management of the groups may be by moderators, group leaders, the presenter or one of the presenter's assistants. The particular configuration chosen may depend, for example, on the work load.

Interaction Structure

In an exemplary embodiment of the invention, the structure of the interactions is of a QAC form, i.e., a question, followed by one or more answers, followed by one or more comments. This format may be enforced, for example, not allowing a question to be based on a question and/or limiting the number of, answers and/or comments allowed per participant and/or per question. Alternatively or additionally, a plurality of structures may be allowed (examples described below), with only those structures allowed. Alternatively a freeform structure may be allowed. Optionally, the range of available structure components is limited, for example to statements, questions, answers, comments and suggestions. Alternatively or additionally, the linking between components is limited, for example, questions may only be allowed to depend on answers or on statements. Alternatively or additionally, the source of each component is limited. For example, in one embodiment, a participant may not be allowed to answer his own question or comment on an answer to his question. Optionally, the actual structure is identified, for example for use when displaying question threads.

An exemplary structure is SQAC, i.e., statement followed by question, answer to question and then comment. Another exemplary structure is QAQAC, in which an answer is followed by a second question on the answer. In some cases, an interaction may be split when such a second question is advanced, so that a new ad-hoc group is created with those that join the second question as members and with the "base" of the interaction being the second question.

In an exemplary embodiment of the invention, an interaction structure can be cloned (manually or automatically), for example, if there is a large number of interested participants, if there are several divergent points of view, or if the interaction is generating a large amount of information.

Alternatively or additionally, two structures may be merged (for example manually), for example, if the current information items are similar. In an exemplary embodiment of the invention, old information items are detected, so that merging of structures only has to take into account the current items. Optionally, a structure can be linked to a different structure, for example, a question being based on a comment in a parent structure.

In an exemplary embodiment of the invention, the question structure is handled as a triggered protocol. A question, statement, note in a slide, predefined question by a participant, etc., serve as a trigger to create a new question structure (e.g., a QAC structure). The trigger initiates a process of exposing the trigger or a derivative thereof to participants and/or create an ad-hoc group. Responses can serve as further triggers or as part of the existing structure, depending, for example, on system definitions.

Time Line Flexibility

One feature of some embodiments of the invention is that each participant can have a private time line, which may be different from that of other participants. Such a private time line can have, for example, one or more of the following attributes:

(a) individual time offset from a main event time line, e.g., different participants may have a different clock time;

(b) individual time advance rate, e.g., different participants may advance at different rates;

(c) individual content, e.g., not all participants receive the same content, some participants may receive more, less or modified information than others, so different time lines can cover different subject matter; and/or (d) individual time order, e.g., not all the participants experience a same order of information presentation.

In some embodiments of the invention, such a private time scale allows a participant to interact -with an event at his own pace. In some embodiments, a main event time fine is provided, which may be used, for example, as a basis for synchronizing between different time lines. In one embodiment, the presenter's time line serves as such a main time line. However, this is not essential. Moreover, in some embodiments and/or situations, there may be no main event line.

As noted below, for example, multiple time lines can also be used by other actors, for example by a presenter, to allow time for analyzing feedback or by a moderator, for example to simultaneously moderate a plurality of participants with different time lines and/or virtual times. It is noted that such a moderator may moderate participants that are ahead of him, as well as participants that lag behind.

It should be noted that a single actor may belong to several time lines or content lines simultaneously.

Time Line Lag

FIG. 5A is a time line chart 500 of an exemplary main event, showing multiple virtual times hi accordance with an embodiment of the present invention. An exemplary time line 502 is shown, which line represents the unfolding of the event. It should be noted that in some events, such a time line cannot be known ahead of time. Such a time chart may be, for example stored in a memory of the system.

In this exemplary case, the "real time" is indicated as a point 504. In one embodiment of the invention, the presenter is at a future point 506, i.e., the presenter leads the real time. For example, a presenter may start speaking 10 minutes before a lecture actually starts. An advantage of such a lead is that the presenter has time to analyze and/or respond to questions and/or other feedback without actually affecting the flow of the event. The presenter can then take the time to look at and/or respond to questions without visibly falling behind.

A particular participant may lead even the presenter, marked as time point 508. In one embodiment, the leading participant views a recording of the presentation part of the event rather than the live presentation. However, such a leading participant can still interact with the rest of the participants, and by slowing down, can receive live, rather than received information.

A plurality of participants may have similar virtual times, marked in general as points 510. A second group of participants may lag still more, marked as a group 512. A potential advantage of lagging is that participants at time 512 have the benefit of viewing questions and answers set up by participants at time 510, while participants at time 510 may need to make do with questions and answers from a previous occurrence of the event. Although the participants of 510 may not all share the exact same time line, they may be clustered, as a group. The group may then be defined using its statistical (time) properties, for example, average, median and variance.

A potential disadvantage of such lagging is that any new questions by participants at time 512 are less likely to affect the course of the event, since changing the course may adversely affect the participants at time 510. However, as will be noted below, the presenter can still provide a live answer to the participants at time 512, without substantially affecting the presentation to participants at time 510, for example, time 510 will advance relative to time 504 during the answering of the question, while time 512 will stay in place.

Time Rate

FIG. 5B is a time rate chart 520 of an exemplary main event, showing multiple exemplary virtual times progression rates of a same linear temporal trajectory, in accordance with an embodiment of the present invention. The "time axis" represents the event time. All the variety of possible progressions cannot be shown, instead, what are shown are exemplary progression that exemplify features of such other progressions. In particular, different ordered partially overlapping trajectories are not shown in FIG. 5B for clarity, even though they may be provided.

A nominal time rate is shown as reference 522, with content shown as a linear function of advance in the time. It is noted that in many typical events, the rate of content provision is not constant. However, FIG. 5B shows a constant rate for ease of comparing the other rates to it. Thus, a non-nominal time rate may have the particular property of providing to a participant a fixed rate of new content presentation.

A slow time rate 524, for example, may be suitable for a participant that requires more time to assimilate information, for example, if the content is complicated for the participant or if the language of the event is foreign (to the participant). In one example, a participant slows down by stopping the presentation stream. In another example, the participant slows downs by instructing the system to increase pauses between words or within words.

A start-stop time progression is shown as reference 526. In t his type of time progression, a participant stops receiving new content, for example as indicated by references 531 and 532. This time may serve, for example for interaction in a discussion group on a question, reviewing relevant material or for a break. To make up for lost time, such a participant may accelerate the rate of the time progression, for example as indicated by a time segment 533. One method of speeding up is as well known in fast playing audio devices, reducing pauses between and within words. Images may be speeded up to match, for example by deleting frames or increasing frame rate.

Alternatively or additionally, the participant may accept a time lag relative to the main event, for example as indicated by the end of time segment at reference 526, that is parallel to reference 530 but does not meet it. As noted above, this time lag may have a minimal impact on such a participant's interaction with an event, especially if the participant is one of many participants with a similar lag.

A reference line 530 indicates a time rate progression that is substantially the same as the nominal progression. However, at points 534, the event time line may stop, for example for advertisements. Alternatively or additionally, some participants may receive different content from other participants. In some cases, this means more content. Thus, while the main event skips over points 534, for those other participants content may be provided at points 534. If the content is provided while the main event is delayed for the purpose of dealing with a question, the event time line will stop.

Reference line 528 shows a case where a participant advances at a rate faster that the event rate. This can be, for example, if the participant utilizes a lead of the presenter on the event or if the participant views recorded content. Time segments 538 are provided to allow the event line to catch up.

As noted above, there are various situations where a participant may have a time period during which, at least in the participants time frame, the event does not progress. Such periods can be used for, for example, for discussions, breaks, responding to questions, researching, receiving in-depth content, viewing advertisements, responding to polls and/or performing quizzes. Alternatively or additionally, in some cases, the participant will be forced to stop his advance, while the event continues. The participant can make up the missing content at a later time, for example accepting a time lag, accelerating the content provision rate and/or skipping sections that are unrelated to the event. Alternatively, the participant may change the event order or its contents (e.g., skip some content, which would appear as a discontinuous line on FIG. 5B). In some embodiments, methods of making up for lost time are automatically applied.

In some embodiments of the invention, a participant and/or a presenter have at their disposal a tool that shows at least some of the current time lines, for example in a manner like FIGS. 5A–5C, thereby allowing a presenter to respond to their existence and/or allowing a participant to join a time line.

Multiple Content Lines

FIG. 5C is a content chart 540 of an exemplary main event, showing multiple content lines in accordance with an embodiment of the present invention. A nominal content line is marked 542 and shown as consisting of the contents {"A", "B", "C", "D", "F"}, in that order. Although some events may be of a naturally continuous nature, a discrete representation is used for illustration.

A reduced content line 544 is missing the content item "C". Depending on the event type, such a missing item may disrupt the event or not. Thus, some modification to the presentation of the rest of the event may be required for missing (or added) content. The event may be designed for easy addition, removal, modification and/or order change of items.

An enhanced content line 546 includes an extra content item "D2", which may be, for example, an in-depth analysis of "D".

In a modified content line 548, items "A", "I" and "E" are modified to -A'-, -B'- and E'-, respectively. It should be noted that when a subject is removed from several places along an event and/or the event is presented using a particular slant, the effect is that of modifying multiple content items.

Content line 550 shows a combination of changing the order of the time line, items "A" and "B" are only presented after item "E" and the modification of item B, which may be mandated by the change in order.

In another example, parts of the time line may be repeated, a limited or an unlimited number of times, with the content changing or remaining the same during the repetitions. Alternatively or additionally, a single section may be split.

For clarity, all the content lines of FIG. 5C show a single content source. It should be appreciated, however, that an event may include multiple, possibly unsynchronized, presentation sources.

The combination of the time line features illustrated in FIGS. 5A–5C can result in a complex multi-time line situation, in which time lines of different participants may be associated for short periods of time, even if their content and time lines do not meet. Such associated time lines may be grouped together, for example, for the purpose of ad-hoc question groups.

Generation of Multiple Time Lines

The multiplicity of time lines can come about in many ways, in a same embodiment or in different embodiments. In general, the manipulation of time lines may be automatic, for example for compensating for a participant posing a question, manual, for example by a participant electing to join a particular time line or event slant, or semi-automatic, for example the system suggestion to a slow-grasping participant that he join a slower time line.

In designing an event, multiple time lines may be taken into account, for example, providing modular sections that can be seamlessly added or removed and/or defining changes in content presentation responsive to anticipated changes in time lines. Alternatively or additionally, multiple content lines are provided by real-time assembly of sections of an event. These sections may be recorded sections and/or they may be live sections.

Multiple time lines may be created for various reasons, including, for example, one or more of:

(a) responding to a participants' need for a different information detail level;

(b) responding to a participants' need for a different information slant;

(c) taking into account a participant's prior knowledge and/or skills;

(d) meeting a participants predefined or modifiable definition of presentation parameters, for example, speech rate and/or content presentation rate.

It is noted that a participants needs can be determined in many ways, for example, by analyzing the participants' current or historical rate of advance, questions joined or created and/or ranking.

Alternatively or additionally, a time line may be adapted to match a real-world activity of a participant (or presenter or other actor). For example, if a participant is driving a car or walking around town, the rate of content presentation can vary responsive to the traffic conditions, which may be, for example, inputted by the participant. It is also expected that such a participant may desire to occasionally replay the last few seconds, for example if the participant was suddenly engaged in a traffic-related activity.

Multiple Time Management

The number of allowed different time lines may be limited or unlimited. In some events, whoever, it is desirable to limit the number of different event lines and/or control which event lines exist. Although a main event time line may exist, one is not strictly required. Furthermore, the current main event line may change over time, in some embodiments, for example responsive to a ranking by actors or responsive to the number of participants in each time line.

Time Line Navigation

A time line may be navigated in many ways, including for example, one or more of:

(a) a time base index;

(b) by selecting a desired relative lag or lead to a different time line;

(c) by selecting a subject using an index. In one embodiment, the questions and answers index can serve as an index to the event content and/or available time lines.

(d) using a hierarchical representation of a single time line, e.g., subject, sub-subject and details; and/or (e) using a hierarchical representation of multiple time lines, for example, with the different time lines organized hierarchically, for example based on their relative time delays, contents and/or splitting points.

Various tools may be provided for the act of navigation. As mentioned above, in some embodiments display tools that graphically display the available time lines are provided. Alternatively or additionally, text-based tools may be provided.

In some embodiments, a joining tool may be provided. For example, a participant may indicate a time line that he wishes to join and the tool will fast-forward the event presentation, possibly skipping some section to make the time lines meet. The indication may not be required, for example, if a participant stops for a question, the system may automatically advance (or delay) the participant to the nearest group.

Alternatively or additionally, manual tools may be provided for fast-forwarding, slowing, skipping and/or providing in-depth content.

In one embodiment of the invention, a fast-forward tool works by skipping quiet audio sections between words. Optionally, the video image, animation and/or other linked presentation media (if available) are also accelerated, for example by dropping or interpolating video frames.

Time Line Control

In one embodiment of the invention, the system prevents isolation by applying forced "join or leave" rules. Such a rule, for example, may force a participant to join one of a small set of time lines. In another example, such a rule may force a participant to leave a time line, for example if the participant is the last member of that time line.

Alternatively or additionally, the event may have pre-defined leave and join points (or defined ad-hoc, for example by a moderator), such that a participant can join and/or leave a time line only at such designated points.

Alternatively or additionally, time lines may be identified by names. Optionally, a comment describing the content and/or suitability of the time line for various situations may also be defined. Alternatively or additionally, a time line may have associated with it matching parameters, to provide the ability to automatically match the time line to various participants. The system may prevent a participant from joining a time line that he does not match and/or without the participant being aware of the type of time line.

Alternatively or additionally, a time line may have a moderator associated with it. Such a moderator is especially useful when the time line views the event at a certain slant. A moderator may desire to have only participants with certain views join the particular time line. Thus, a time line can also define a group or a super group, for example for the purpose of prorogation of questions or dissemination or filtering of information. In one example, a participant will only see comments posted by members of his group.

As with other automatic features of some embodiments of the invention, a participant may define default behavior for the system to follow, allow or use in suggesting or choosing alternatives. Such default behavior may comprise, for example, one or more of:

(a) a desired maximum time lag (or other time line properties) relative to other participants or groups of participants;

(b) type of "join to group" to apply when a participant finishes a question discussion and is free for another discussion; and/or (c) minimum or maximum size of time line group to join.

The control of the number of different time lines, especially with regard to content may be used to solve a different problem, that of participant mind set. Often, different participants approach an information event with different expectations. Questions posed by such participants may require an understanding of the mind set. However, as the number of mindsets increases, it may be more difficult for the presenter to deal with the inter-personal variability thus exposed.

In one embodiment of the invention, the participants are forced to choose one of a small number of event lines, each representing a different mind set. These lines may be pre-defined, or, in some cases, new lines may be defined, for example by a moderator, responsive to an analysis of the class state. In each such lecture line, all the participants agree on a substantially same mind set. This mind set can be taken into account by the presenter when answering questions. Providing the mind set, for example as a short text description may also assist the presenter in dealing with questioners that are not in a particular event line. The mind set may be defined by the participant or by other actors, for example a moderator.

The presentation may be the same for all the mind-set event lines. Alternatively, at least some mind-sets receive a different presentation, for example, a moderator selecting what material to pass through. Alternatively, an automatic filtering program may select what material is presented and/or select changes in a time line and/or content for each mind set.

Closing the Loop

In some embodiments of the invention, various ones of the actors can receive feedback on the event or their interaction with the event. Such feedback can be used for various ends, including, for example, one or more of:

(a) optimizing the performance of the actor;

(b) enhancing the quality of the event (various exemplary measures are described below);

(c) planing changes in the current or a future event;

(d) detecting problematic actors and/or actors with problems; and/or (e) personalizing the interaction with individual actors.

Although any actor may receive feedback, some actors may be able to use such feedback to a greater effect. Alternatively or additionally, different actors may receive different types of feedback. In a particular example, a participant may receive feedback as an individual, for example his class ranking, or as a group, for example the ranking of the question that he joined or a general feedback to the class regarding its participation level. Alternatively or additionally, a feedback may be mixed individualized and group, for example a general feedback to a class regarding its participation level may include a personal note to each participant indicating that participants contribution.

Presenter Feedback

The presenter of information may have several jobs, as described above, including managing the content to be presented, actual presentation, fielding questions and managing the class. Each job description may have different suitable feedback. Alternatively or additionally, some of these jobs may be assisted by or taken over by various assistants.

One type of feedback that is useful in some embodiments of the invention is integrative feedback. This type of feedback shows the general trends and situations, for example, the average time line lag, the number of outstanding questions and/or the average ranking.

Another type of feedback that may be useful in some embodiments of the invention is particular feedback. This type of feedback may be used to enliven the integrative feedback, for example examples of current questions. Alternatively or additionally, this type of feedback is used to raise particular issues, for example a particular current question with a high ranking and no good answers. Alternatively or additionally, this type of feedback may be used to keep watch on particular actors, for example problematic participants or problematic moderators.

Exemplary types of feedback include:

(a) feedback on the audience behavior;

(b) feedback on the assimilation and/or agreement with the event content; and/or (c) questions and/or comments by actors.

Some types of feedback are provided automatically, for example in a small status window. Other types of feedback may be requested by the presenter. Additionally, some feedback may be implicit, for example, the number of current questions can be determined automatically and can serve as a measure of participant understanding, as can the average time line lag. In some cases, explicit feedback may be desired. For example, a presenter can send a question to all actors requesting them to respond with a number representing their level of understanding. Such explicit feedback may be initiated by the presenter. However, other actors may initiate it as well. Alternatively or additionally, the system may initiate such explicit questions.

In some embodiments of the invention, one or more of the following techniques is used to control the feedback:

(a) default and user controlled levels of detail and/or rate, for acquisition and/or display of feedback;

(b) thresholds and/or other pre-defined triggers for feedback presentation;

(c) scripts (described below), which are automated programs that can initiate feedback acquisition, analysis and/or presentation; and/or (d) definitions whether the feedback is to be provided by pull methods (actor request) or push methods (system initiation).

Other Actor Feedback

The above types and variants of feedback can also be used for other actors. However, the other actors may be more interested in feedback about processes other than those that interest the presenter.

For example, a moderator of a particular group may be interested in feedback regarding the actual participation level of the members in the discussion. Also, such a moderator may be interested to see if the discussions are assisting or interfering with the course of the event, at least from the point of view of his group. The moderator may also desire to see his relative ranking compared to other moderators and/or their groups.

In another example, a participant may be interested in one or more of the following types of feedback, which can encompass not only the participant's interaction with the content of the event, but also the participants interaction with the event itself and/or other actors of the event:

(a) the participant's level of understanding and/or participation;

(b) the participant's relative time line position; and/or (c) ranking of the participant's questions and answers.

In addition, a participant may be interested in general feedback, for example, event statistics, such as details about the key and/or top participants.

Fast and Slow Feedback

Although in many cases real-time feedback is preferred, for example showing an instant snapshot of one aspect of the event, slower feedback may be provided in some embodiments alternatively or additionally to real-time feedback. The feedback may arrive in time to affect a current event, for example feedback regarding the start of the event may arrive before its end. Alternatively or additionally, the feedback may arrive only after the event is over. A particular type of feedback is generated by analyzing the course of an entire event, after the event is over. In some cases, preliminary feedback may be available during the event itself. One or more of the following time durations may affect feedback provision times: the network propagation time, the average participant response time to a question, a period of time required for gathering statistics, such as the average time it takes a participant to pose two questions and/or the analysis time.

In some events, such as lectures in a course, the feedback from a particular participant or group of participants may be especially relevant in a later event which that participant joins.

Feedback Sources

A feature of some embodiments of the invention is that substantially any activity or piece of information may be associated with feedback. In some cases the feedback is numerical. In others, the feedback is free-form, for example text or speech. Alternatively or additionally to feedback being a type of score, the feedback can be constructive, for example, including suggestions for improving. Constructive criticism can also be automatically generated. For example, if the question joining pattern of a participant matches that in a database of a participant that did not read a suggested reading, the system can suggest the participant review the suggested reading.

In some embodiments of the invention, free-from feedback, such as comments can be joined, or selected from a list of available comments, in a manner similar to a question. Thus, a smaller umber of different free-from feedback items are generated. Also, additional information or analysis may be associated with particular free-form comments.

One possible source of feedback information is ranking activity by other participants or actors. The ranking may be relative or absolute. In some cases, the ranking is implicit, for example, if a participant poses or joins a question or makes a comment that has a match in the database, the previously assigned ranking is associated with the question. A question (or other item of information) may have a plurality of ranks. In some cases, an actor can suggest adding a new attribute to be ranked to an item. For example, a question may have the following rankable attributes: relevance, style, coherence, and/or support level (to event). In addition, the act of joining a question can define a rank, at least with regard to relevance.

In an exemplary embodiment of the invention, an exposed question can include the properties of exposure group, join number, answer number, rating per answer and number of comments per answer. Analyzing these properties can provide, an interest level (e.g., what percentage joined), answer quality (e.g., average rating), question quality (e.g., average of question rating and answer rating or comparing number of comments to average). For example, these ratings may be used to determine the most interesting questions and/or those without satisfactory answers(e.g., all answers with low ratings).

In an exemplary embodiment of the invention, the system (or a human actor) uses the audience as a laboratory to test the level of interest that a question can raise and/or to determine an appropriate time to bring up a question. In an exemplary embodiment of the invention, different questions (or the same question under different conditions) are presented to different sample groups of the audience. The resulting discussion and/or raking is used to order the questions.

Another possible source of feedback is automatic scoring by the system. This scoring includes, for example, statistics gathering, such as the number of questions raised and analysis of particular participants, for example to determine whether the content of the event is too complex for the participant.

In an exemplary embodiment of the invention, a participants activity is evaluated based on the number of questions he asked, answers and/or comments he provided, ranking of the above, interest levels generated by the participants questions, number and/or percentage of joins and/or exposure rate and/or level.

Another possible source of feedback is polls, where the actors are presented with a questions, possibly a multiple choice question, for example: "Do you want a slower presentation or a more in-depth presentation". Similar to polls are votes, where the participants can directly affect the course of an event. For example, the participants may vote on which time line should be made the main time line, from a plurality of currently active time lines. In another example, buttons (or other another control) may be provided to allow a participant to report his satisfaction with the event or part of the event (e.g., interesting, boring) or to suggest changes in the event, e.g., change the speed of the event or suggest items to discuss in depth into or to skip.

As described below with regard to personalization, in some embodiments, the interaction may be personalized for each actor. In particular, the feedback presentation and interpretation may be differently performed. In one example, a participant may be interested only in a "style" rank of his questions and not in a "relevance" rank of his questions. In another example, a participant may choose to ignore feedback from participants that have personality properties that match a certain pattern or participants inside or outside of particular groups.

Actor Point of View and Attention

An interaction with thousands or millions of actors may be too complex an event to comprehend or interact with. As noted above, the tools of clustering participants into groups and viewing integrative feedback may assist in comprehending the event. Alternatively or additionally, an actor, and especially a participant, may be interested in only a portion of the event. This portion may represent a particular slant on the event. Alternatively or additionally, this portion may be a focal point on which the actor's attention is focused.

On a most basic level, the client software at the client may include a blocking module that can serve to reduce interruptions from other sources, for example instant messages, e-mail and telephone calls (through the same device as used for the interaction), and possibly prevent the participant from using the computer at a same time for other uses, such as surfing the Internet.

As noted above, various information filters can be defined in some embodiments of the invention, for example filters that prevent the presentation of certain questions to a participant. In some embodiments of the invention, content, answers and other information, even if they come from the presenter, will not be disseminated to all the participants.

Alternatively or additionally to an actor defining limitations on what information will be presented to him, an actor may define limits on the recipients of information he generates. For example, a participant may require that a particular question cannot be exposed to a member of a group with a particular slant on the event. One exemplary case would be a sports match event, where the fan of one team would not want his comments to reach fans of the other team.

Alternatively or additionally to limiting the dissemination of information, at least some information may need to be actively searched for, for example using intelligent search agents. In one embodiment of the invention, an actor can select or program his agent to find only certain types of information, for example using a filter setting.

Channels

As noted above, the content of an event may be provided as channels, for example, one channel for each presenter and additional channels for side-discussions. A channel may be any type of media, such as text, video or audio. One type of focusing is effected by a participator (or other actor) choosing which channel(s) to be tuned to. As will be described below, for example, in some situations, a participant may become a channel source. Alternatively or additionally, a channel may have associated with it a moderator, for controlling its content and/or its accessibility. Alternatively or additionally, channels may be arranged in a hierarchical structure or a different structure. For example, a presentation audio channel may have associated with it an animation channel and a text, notes, channel. A sub channel, for example a main discussion thread may also be associated with such a channel. In some embodiments, a participant may chose the channel(s) he views by selecting a group of associated channels and/or defining filters for those channels he do or does not desire to view.

In some embodiments of the invention, a participant may simultaneously view a plurality of channels, even channels of same media types, such as multiple video channels. It is not always the case, however, that two channels are actively disseminating information at a same time. For example, in a panel event, each channel may represent a different panel member. These members do not usually speak at the same time.

In some embodiments of the invention, two or more presentation channels may be artificially serialized. In one example, a composite channel is created, in which one presentation channel is provided for a while and then a next presentations channel is provided. The selection of the segments of the channels to alternate may be based, for example on hints, input from a moderator, detection of external events, such as questions and/or by analysis of the presentation stream itself, for example to detect pauses. It should be noted that by delaying a presentation channel, it is possible to determine ahead of time the lengths of the segments and/or select alternation points.

It is also noted that in typical audio presentations there is a significant amount of silence between words that can be truncated, as well as the possibility of accelerating the presentation of the words themselves. The streams of the other channels associated with such an audio presentation may also be accelerated, for example by interpolation and/or truncation. Thus, typically a plurality of audio or video presentations can be accelerated and provided using a single channel, while remaining legible.

Exemplary Filter Parameters

Following is a list of exemplary parameters, one or more of which may be used in some embodiments of the invention to selectively filter information:

(a) ranking, global and/or of different attributes;
(b) scoring;
(c) participant properties of the information source; and/or
(d) propagation profile of the information.

Event Focus Change

In some embodiments of the invention, alternatively or additionally to a participant selecting a different part of the event to focus on, the event focus itself may change. Such a change may include, for example, one or more of change in the main event time line, event content and/or identification of the presenter.

In a particular embodiment, a participant may raise in level. For example, a participant that generates high-ranking content may become a presenter in his own right. Alternatively or additionally, such a presenter may become a moderator or a different type of non-trivial actor. The other participants may choose to focus on the new presenter rather than the old. In some embodiments, the audience can vote on the main presenter. Alternatively or additionally, one or more moderators may assist is uplifting other actors.

Optionally, the identification of the main presenter has non-content related aspects, for example, the bandwidth allocation for transmission of information may change based on the identification of the main content source.

In some embodiments, one or more of the actors have a non-equal right to control the content. Such rights may be computer mediated, for example as permissions or they may be human mediated, for example via an assigned actor, such as choreographer 128. Thus, for example, the presenter may be able to prevent a participant from become a single presenter. Instead, the participant may become a secondary presenter. The main presenter may suggest, to at least some participants, to view this secondary channel, for example to receive a learned response, form the participant, to a question that is of interest to many other participants. Possibly, all the participants are forced to view the main presentation. In some embodiments, each question-group defines a channel, in which a presenter, possibly the main presenter, can be active. It is noted however, that in some embodiments, a presenter may be regulated a lower-level position, such as that of a participant, in a secondary channel. From a participant's point of view, several parallel question and answer sessions may be going on at a same time, even if the presenter actively speaks in only one channel at any given instant.

Intra-participant Communication

In some embodiments of the invention, participants may be provided with a chat-like tool for communicating between the participants, for example, to ask each other questions. In some embodiments, this tool is integrated into the question and ranking mechanisms, however, this is not essential.

One or more of the following features are optionally provided to enhance chat and/or multi-media chat mechanisms:

(a) a mechanism for participants to join, be recommended or define parameters that control joining;
(b) a mechanism for controlling information propagation and presentation;
(c) ranking of the information items of the chat;
(d) providing a context, for example a bookmark in one or more channels of the event;
(e) supporting the sharing of notes and other material accumulated, prepared and/or reference to the event, during the chat; and/or
(f) supporting a raise or reduction in the importance of the chat, and/or tools for propagating the contents of the chat to other interested parties.

On-line Control Modification

In some embodiments of the invention, actors can apply on-line control to change the course of the event. The change may be global, for example stopping a music event to add in a song requested by many participants. Alternatively or additionally, the change may be local, for example a moderator changing a participant's privileges, time line or information filters. Other types of intervention include, for example automatic control of ad-hoc group size and retraction of questions.

When there are changes in the main event, this might cause the creation of multiple content lines, rather than changing the event for all participants.

Exemplary Processes

Following are descriptions of some exemplary processes that may be performed in some embodiments of the invention.

Event Planning

Figure 6:
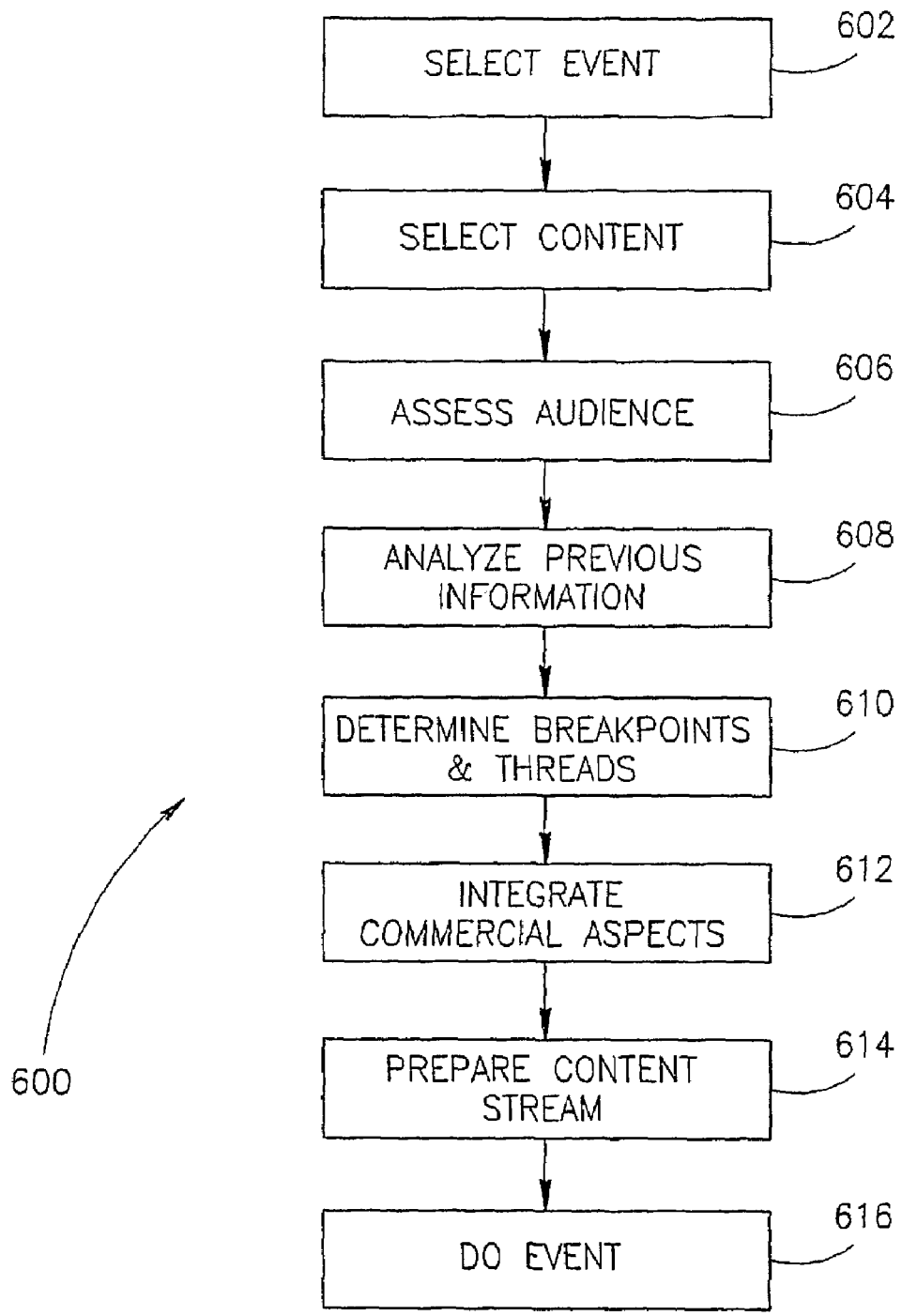
FIG. 6 is a flowchart of a method of event planning, in accordance with an embodiment of the invention.

FIG. 6 is a flowchart 600 of a method of event planning, in accordance with an embodiment of the invention. An exemplary possible process was selected. It should be noted however that there are many planning methods known in the art. Also, the order of acts shown in the method of FIG. 6 can be varied and/or acts omitted.

In an exemplary embodiment, an event is planned by a production team which can include, for example, a producer, a director, one or more presenters, one or more moderators, one or more commentators and one or more commercial sponsors.

At 602, the event type is selected, for example from the list of exemplary applications described below.

At 604, the general content of the event is selected, for example for a music event, the identification of the live performers.

At 606, the expected audience is assessed, for example to determine an expected level of trouble makers, number of expected questions, type of supplementary information that may be of interest and/or heterogeneity of the audience.

At 608, input is provided form previous similar events or from previous events with a same or similar audience. This information may be used, for example, to assist in assessing the audience or in figuring out an expected unfolding of the event.

At 610, the general event plan is determined, for example, including breakpoints, for example for asking questions, modular event segments that can be reordered, extra event segments for advanced participants, removable event segments for less advanced participants and/or multiple event content lines for different slants.

In an optional act 612, various commercial interest are integrated into the event, for example planning advertisement targeting and delivery.

At 614, the content streams for the various channels are prepared, for example, text-books, slides, lecture outlines and/or links to related sites.

Then, the event may be performed (616). It is noted however, that various planning activities may continue while the event is unfolding, since, in some embodiments, the event plan can be modified after it starts.

Joining an Event

Figure 7:
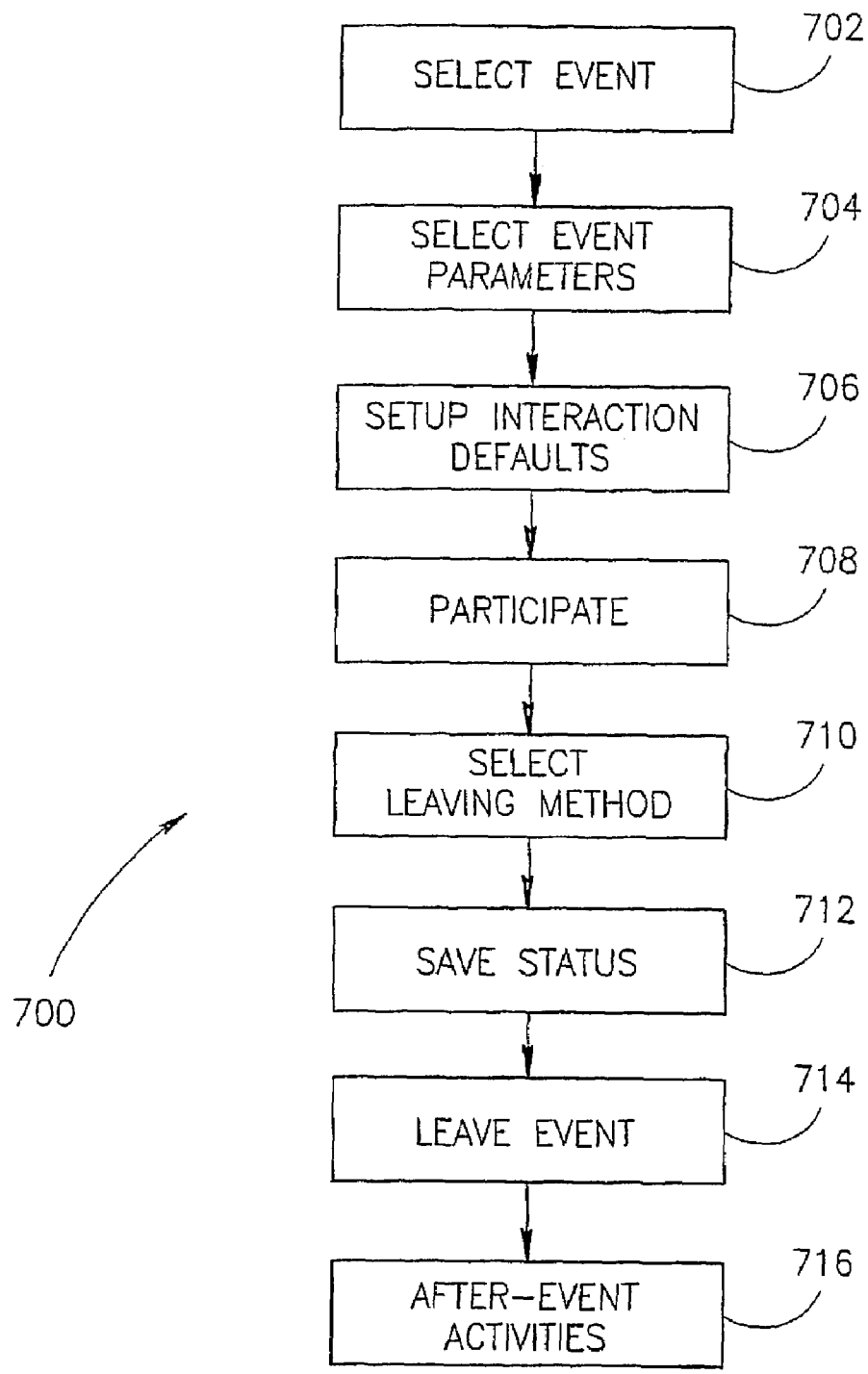
FIG. 7 is a flowchart of an exemplary method of joining an event, in accordance with an embodiment of the invention.

FIG. 7 is a flowchart of an exemplary method 700 of joining an event, in accordance with an embodiment of the invention.

A first act is selecting an event to join (702). The selection may be, for example, from a catalog, in response to an advertisement, as part of an ongoing curriculum, as part of a group of buddies or in response to a personal offer, for example made by e-mail from a computer system that identifies prospective participants and other actors for an event.

Next, the prospective participant can select the event parameters (704), for example, if the event provides several quality levels, several interaction levels and/or several time lines, the participant can choose one. In particular, a participant can match his available time to the possible time lines of the event. Alternatively, the system can personalize the event to match the participant's available time and/or prior knowledge. Optionally, the system (or a moderator) modify the event itself responsive to the profile and/or resources of joining participants.

At 706, a participant defines the interaction parameters. These parameters may include, for example, filtering parameters and/or screen setups. Optionally, the participant selects these parameters from a limited set of parameters, thus assuring some minimum amount of uniformity between participants, for example, same screen layouts or same interaction tools. In some embodiments, the participant may then modify the parameters.

At 708, the participant participates in the event.

The participant may leave the event at its end. Alternatively, a participant may leave an event before its end. In some cases, a participant will modify his participation level during an event, for example by modifying interaction parameters.

At 710, a participant can select a method of leaving an event. Exemplary methods can include, abrupt stop, gradual leave-taking, tying up of loose-ends, skipping fast to the end of the event and/or stopping and resuming at a later time, the same event or a comparable one.

In an optional act 712, a participant can save his status in the event. This may be useful, for example, if the event repeats periodically, or if the participant receives credit for the participation.

At 714, the participant leaves the event. However, the participant may continue to perform activities related to the event (716), for example, home work, interaction with buddies about the event and planning participation in a new event.

Exemplary Participant Tools

Figure 8:
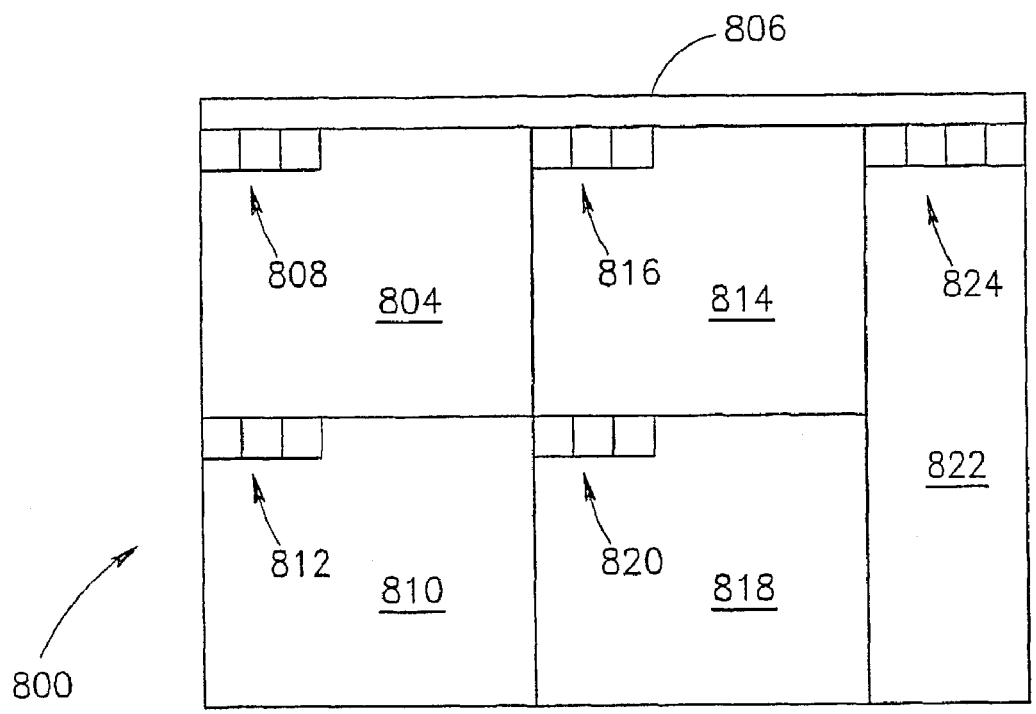
FIG. 8 is a schematic representation of an exemplary screen display for a participant, in accordance with an embodiment of the invention.

FIG. 8 is a schematic representation of a screen display 800 for a participant, in accordance with an embodiment of the invention. It should be appreciated that other, very different display screens may also be used. In addition, in some embodiments of the invention, a participant may have freedom to rearrange his screen. Screen 800 is provided as a means for presenting the myriad of tools available to a participant.

The technical ability required of the participant (or other actors can vary widely between applications. On the one hand, be selecting defaults, a participant may be only required to know how to control an Internet browser, albeit, such a participant may miss out on some features. On the other hand, some features, such as personally programmed scripts may require a participant to have deep technical knowledge. In some embodiments, moderators or other actors assist participants that do not have sufficient technical abilities and/or act as a live help desk. Alternatively, standard type help tools may be provided. It is noted that the above described feedback tools may also be used to detect participants with problems controlling their station and/or for determining the general effect these problems have on the interaction quality.

Exemplary screen 800 is divided up into five logical sections:

(a) Presentation channels 804. As a plurality of different presentation channels may be simultaneously available, a tab selection tool 808 may be provided to select between them. Secondary channels, for example lecture notes may be viewed in other sections of the screen.

(b) Pads 810. This section can present static and dynamic information, for example, a class blackboard (which may, however, be personalized with regard to content for the particular participant), lecture slides, a personal note pad and/or a group white-board, for example for posting messages to buddies. Again, a tab tool 812 may be provided to select which information is currently presented.

(c) Information displays 814. This section can include, for example, on-line course books, search tools and/or relevant Internet pages. A tabbing tool 816 may be provided.

(d) Interaction controls 818. Although a menu bar 806 may be provided, in some embodiments a screen area is designated for controlling the interaction and providing feedback. A tool bar 820 may be provided for accessing various controls. Exemplary possible interaction control tools include:

1. Time controls, for joining, selecting, creating and/or leaving time lines and/or for other manipulation of a time line.

2. Interaction settings forms, for example for setting interaction defaults and filter parameters.

3. Annotation tools, for example for marking bookmarks on any information source or channel, for copying information form channels and/or for annotating a channel.

4. Recording tools, for storing and/or replaying information and/or presentation channels. Such storage may be local or it may be central, in which case, recording may comprise only a bookmark.

5. Alert tools, for setting alerts, and for selecting and/or programming scripts.

Interaction control tools can also include display tools for providing various status information, for example one or more of:

1. Alerts, such as class ranking, or the existence of an over-threshold time lag.

2. A time line display.

(e) Communication tools 822. These tools can include, for example, a chat tool, an instant messaging tool, an e-mail tool, an audio and/or video tool, a question and answer tool and a video camera (and optionally a microphone) for imaging the participant (not shown), for communication and/or for generating a content stream. An optional control panel 824 is also shown.

A tool which may not have a visual representation at all times is a filtering tool, which reduces the amount of information presented to a participant. In an exemplary embodiment of the invention, the amount of information is tailored and/or limited to be at or below the participant's information acquisition level. This level may be determined, for example, by a user setting the desired rate of information display and/or by tracking a correspondence between the user's participation level and the information display rate. In an exemplary embodiment of the invention, the display rate is vector or scalar dependent on one or more of the following components: content level (e.g., number of words), complexity of display (e.g., length of sentences), number of subjects, complexity of interaction structure for the subjects, and/or size of screen. Alternatively or additionally, the display rate may be interaction and/or participant dependent.

The filtering may depend, for example, on keywords, subject field, relation to parts of the event that the participant expressed interest in and/or had difficulty, amount of information form a particular subject already shown, ranking, time of arrival and/or length or complexity of information item.

Optionally, filtered out information is still available via a queue mechanism (e.g. one or more buttons that when pressed open an interaction window) and/or a secondary list mechanism that allows a participant to browse (or displays a running list) through a wider range of information items. Alternatively or additionally, a directory mechanism, as described below, is used.

Client Display and Filter

In an exemplary embodiment of the invention, a question and answer (Q&A) tool is provided in screen 800. In an exemplary embodiment of the invention, the Q&A tool is used for one or more of:

(a) viewing statements, questions, answers, comments and/or suggestions;

(b) posting (new and/or responsive) statements, questions, answers, comments and/or suggestions;

(c) ranking statements, questions, answers, comments and/or suggestions;

(d) joining, rejecting joining or intermediately joining an interaction structure; and/or (e) objecting to abusive use and/or language by others.

In an exemplary embodiment of the invention, the Q&A tool is used as a general messaging tool, for example, by posting a message to a "system" forum.

In an exemplary embodiment of the invention, the display is a scrolling display including a section for each item of information, e.g., question, answer, comment or suggestion. The scrolling may be smooth or stepwise. Alternatively or additionally, a participant may pause the scrolling. Optionally, the pausing affects the general time line. Alternatively or additionally, modifying the time line, modifies the display in the Q&A tool.

In an exemplary embodiment of the invention, when an information item appears that is unrelated to previous items (e.g., a new thread), it is so marked. Alternatively or additionally, when an item is related to a previous item, one or more previous related items are displayed, for example, as a pop-up window, in a fixed part of the screen and/or being inserted into the scrolling view adjacent to the new item. In an exemplary embodiment of the invention, a list of the current threads is displayed, for example in a separate window, optionally including an indication of the current highest ranking item and/or the base item (e.g., a question). Alternatively, an indication of the current rank of the thread (or number of active participants) may be displayed.

Optionally, the display includes an indication of the structure that item takes part in (e.g., QAC, QACC) and/or of the ranking of the item. Optionally, when a participant adds an item, the system forces the participant to select the interaction structure to which the item belongs.

In an exemplary embodiment of the invention, an archive view is provided, in which information items are arranged by threads. Possibly, the thread for each item is accessible from the scrolling display. Optionally, such an archive view is used to allow participants to browse an even after the fact, for example, the entire archive being posted. Optionally, a replay of the event can be performed, for example, by generating a scrolling display ad-hoc.

An exemplary implementation of a participant display is described in Israel application 141376, the disclosure of which is incorporated herein by reference.

Exemplary Presenter Tools

Figure 9:
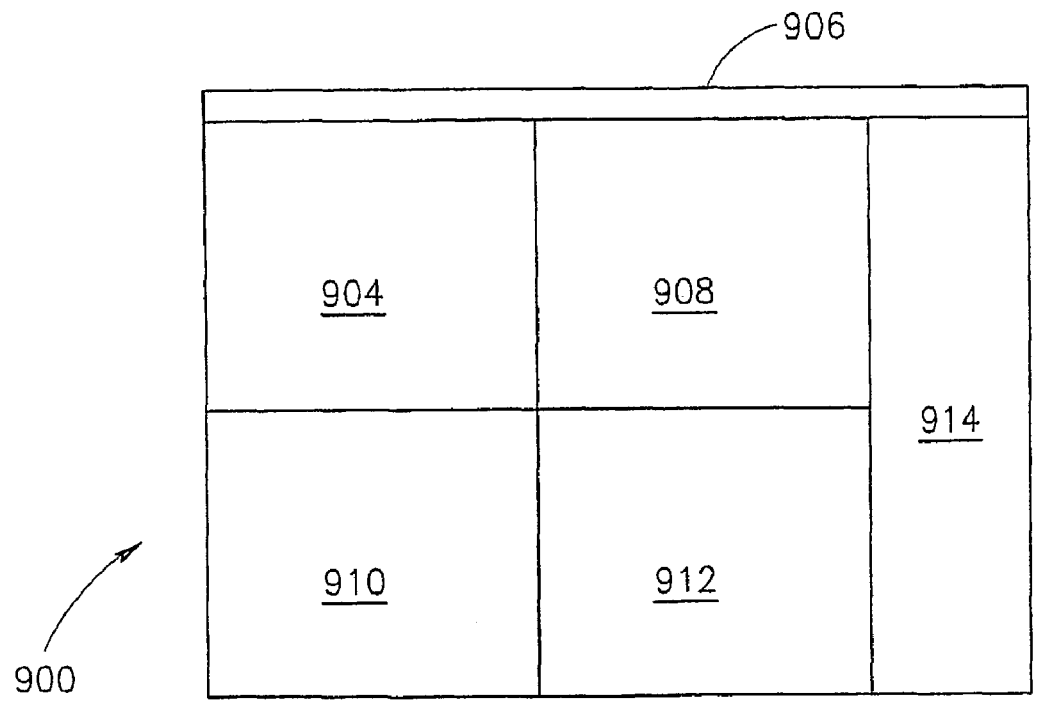
FIG. 9 is a schematic representation of an exemplary screen display for a presenter, in accordance with an embodiment of the invention.

FIG. 9 is a schematic representation of a screen display 900 for a presenter (or other actor, such as a moderator or choreographer), in accordance with an embodiment of the invention. A presenter may have available all the tools available to a participant and optionally has the ability to control his display layout. For clarity however, only five logical screen sections are presented, besides an optional menu bar 906:

(a) Self presentation channels 904. This section can be used to display and control slides, a blackboard or other information sources used by the presenter.

(b) Feedback section 908. This section can be used to present integrative or particular feedback on the class status, for example as described above. In particular, however, a presenter may have the option of eavesdropping on selected participants, for example by selecting the participants or by defining a filter to select participants or information exchange. These tools may assist a presenter in getting a feel for the audience.

(c) Communication section 910. This section may be used for communication with special actors, such as moderators, the choreographer and other presenters. Alternatively or additionally, this section may be used for communication with participants, for example with individual participants, such as in a video question and answer segment or as a group, for example sending a message to a plurality of participants.

(d) An event overview 912, which can be used, for example, to provide the presenter with a sense of the event flow, as a means to present suggestions and/or event changes from moderators or a choreographer and/or for marking ideas for the next rendition of the event.

(e) A Q&A section 914, which may include, for example, a plurality of concurrent question threads.

Other actors may also have suitably tailored work stations. It is noted that alternatively or additionally to visual feedback, text feedback may be provided as well, both as a method for the system to interact and by conversion of text messages to speech. Alternatively or additionally, the control of the station may be using speech commands.

In some situations, a presenter will not sit in front of a camera and a display such as shown in FIG. 9. Rather, a lecturer may lecture to a class and using a blackboard. A pointing device the lecturer uses may have a position sensor on it, to detect the location on the blackboard (or slides) being pointed to. The blackboard itself may be imaged for transmission as can be the presenter. Questions from the remote audience may be presented by a living representative of the system, who asks the questions aloud and records or streams the answers into a network device that disseminates the information to the remote audience.

Exemplary General Tools

The above tools were described with reference to particular actors, although other actors may use them as well. The following are tools which are generally applicable to all actors. One or more of the following exemplary tools may be provided:

(a) Q&A database. This database can be used, for example to search for previous questions and answers and as an index to an event. In one embodiment of the invention, relevant questions and/or answers may be automatically and/or manually attached to event notes taken by a participant. Such databases may be shared by a group or by the whole audience.

(b) Multi-lingual tools. For example for providing an alternative sound track or subtitles. A translation may be manually prepared or it may be automatically prepared.

(c) Data miner. For example, to search for relevant data on the Internet or in other reference material.

(d) Interaction view tools. In some situations, the audience is dynamically changing all the time, groups, time (and content) lines are being created and destroyed, actors join and leave groups and even the event plan can change. In one embodiment of the invention, static and/or dynamic snapshot tools are provided. A static tool freezes an image of the interaction as a whole (or part of it). A dynamic tool shows the interaction as it changes, for example a current view or a historic view. Recording and/or replaying tools may also be provided.

When displaying the interaction, it is noted that the event may be hierarchically defined, for example, via time lines and/or groups, such as ad-hoc groups and/or relatively static groups, such as those having members with same interests or buddy groups. Alternatively or additionally, various integrative views are provided, for example, a plurality of participants may be represented by a virtual participant (e) Scripts and programming. In some embodiments of the invention, scripts can be define to perform various automatic or semi-automatic (asking for user input) on the interaction space. Exemplary uses of scripts include finding information and providing alerts. An exemplary suitable language for scripts is "perl". Optionally, a script is able to search for and access information, apply logic rules and/or modify system settings. Optionally, a library of pre-defined scripts is provided, so an actor can select and/or modify a script or its parameters, rather than programming from scratch.

Some of the above tools may be provided at the actors' work stations. Alternatively or additionally, some of the tools may be provided at a central location of the system or at a remote element of a distributed system.

General Issues

Following are described various issues that may arise in some embodiments of the invention. These issues are generally optional and/or explanatory in nature, integrating various features previously described.

Quality Assurance

In some embodiments of the invention, a human actor or a computerized agent may be designated for managing the quality of the event. It is expected that by applying various personalization and customization methods, quality may be improved in some embodiments of the invention. Various measures may be defined for the quality of an event, for example:

(a) Average time lag of participants.

(b) Average rank of quality indicated by participants.

If the quality is below a desired level, an alert may be generated to a presenter, a choreographer or other actors.

The checking of quality may also have other aspects, for example, checking suitability of participants for each other and matching of the event content to the participants.

A subject related to quality is the quality of the presenter. One the one hand, the provision of a large audience makes it easier and/or more cost effective to hire the best presenters. On the other hand, many of the interaction tools described herein may be used to allow a lower grade presenter to provide a presentation that meets a desired quality level. In one example, various lecture management tools as described herein can be provided. Additionally or alternatively, feedback tools for providing a class feedback, such as described herein may be useful for presenters with difficulty in assessing a class state. Alternatively or additionally, the time flexibility allows a presenter to stop for a short time and organize his thoughts, without adversely affecting the lecture. The time flexibility can allow a presenter to answer a question, without stopping his train of thought. Alternatively or additionally, the various assistants can take-over tasks the presenter cannot or does not want to do.

Noise Level

A participant may have difficulty following an event, due to various interruptions which are possible, for example, chat-requests, questions and secondary channels. Various tools which may be useful are described above, for example, information filters. Alternatively or additionally, an automated program may check the level of interruptions and suggest (or automatically) reduce the interruption level, for example to match a participant's predefined defaults.

Measures

In an interaction system with various feedback mechanisms, for example as described above, it may be useful to describe objective measures of various quantities. In some cases, objective measures are not possible, however, even subjective measures may be calibrated. For example, a measure of content streaming rate may be difficult to define. However, a human can usually determine the relative ordering of two content rates or state that two content streams have a same content streaming rate. Exemplary measures include:

(a) content streaming rate;

(b) clustering of audience;

(c) noise level; and/or (d) number of interruptions per minute (per actor or some statistic).

Off-line and On-line Processing

Information, especially feedback, may be analyzed in real-time j for example within less than one, ten or one hundred seconds. In some embodiments, at least some of the information is analyzed on line, but at a longer lead time, such as minutes, which may allow the analysis results to be used in the same event. Alternatively or additionally, at least some of the invention is analyzed off-line, after an event and optionally in preparation for a later event. In some embodiments, the analysis is used to fuel after-event discussion groups and/or homework.

Automatic Analysis

One task of some actors, such as some types of moderators, can be to keep track of students with problems and/or detect special needs. Alternatively, this task may be performed by a computer program, for example an expert system that matches interaction patterns of a participant with pre-stored suggestions for correcting the patterns.

Automated tutoring programs are known in the art and these programs include the ability to detect (to some extent) what a student's problems are and/or to personalize a learning experience for him. In an exemplary embodiment of the invention, such tutoring systems are integrated into the system.

Automatic analysis techniques may also be used for analyzing information flow and detecting bottlenecks and other problems.

One advantage of the large number of participants is that such an automated system can detect problems based on the experiences of the same or other participants in the same or previous events. Also, a very large number of participants is available, which can be useful for a learning system.

Another use of automatic analysis of participants is better matching of participants to each other and/or to events and/or event parameters. This can allow participants to be offered a better targeted set of events or options to choose from.

Personalization

A feature of some embodiments of the invention is that the interaction of an actor with the system or with the event may be personalized to the actor's desires and/or needs. The actors for which personalization is performed possibly include the participants. Alternatively or additionally, personalization may be practiced for other actors, for example moderators and presenters. Alternatively or additionally, personalization settings may be made for a group, for example an ad-hoc group or a static group. Alternatively or additionally, personalization setting may be made for particular time lines. Alternatively or additionally, personalizations may be made based on other actor selection methods, for example based on payment amount by the actors. In this and other selection examples, for some embodiments of the invention, actors and/or information may be selected from the system database using various of their attributers.

Alternatively or additionally, to the participants interface being personalized, in some cases, the entire event may be customized to match the available participants and other actors. In the context of an on-line learning application, this can translate into flexible course content, to match the particular participants' (and/or presenter's) prior knowledge and needs. Alternatively or additionally, where a plurality of presenters are available, the assignment of presenters to participants may be performed to personalize the class structure to match a presenter's (or moderator's) desire.

Following is a list of exemplary personalizations, one or more of which may be provided:

(a) Event parameters in general, such as time line.

(b) Interaction parameters in general, such as number of allowed question exposures or a definition of participants that can start a chat.

(c) Personal attention. Detecting participants that need personal attention and providing it to them, for example using automated programs or more frequent contact with a moderator.

(d) Advertisements and product targeting. Not only can these match the event context in general, they can also be made to match a particular participant's time line, identity and/or other parameters. Although different advertisements may be presented to different participants, A single advertisement may be presented to a group, possibly with some customization for different participants, to allow the group members to discuss the advertisement. When deciding what group of participants constitutes a group, the actual level of activity and the actual viewing of the group proceedings may be used as indicators, in some embodiments of the invention.

(e) Personalization of event content and/or support material. For example, a fast participant may receive extra content. In another example, a participant with one background receives different course material than another participant, for example to compensate for a lack of mathematical knowledge or other knowledge pre-requisite. In another example, different participants approach an event with different expectations of what knowledge they expect to gain. The presentation may be personalized to match these expectations. Alternatively or additionally, the presentation method may be matched to a participant's needs, for example matching a participant's need for a particular mix of theory and practice, frontal lectures and self work or learning speed. Another example is matching a participant's need for a mixture of modalities, such as text, speech, animation and video.

(f) Automated book preparation. In some embodiments of the invention, a text book (or software) or event summary is automatically prepared by recording and analyzing the presentation and participants' responses and interaction with the presentation. The book may be prepared to match a particular user profile, based, for example on a match between that user and various participants.

User Appearance

In some embodiments of the invention, participants and/or other actors may present themselves using video streams. This, however, may require unavailable bandwidth. Also, for privacy reasons, some actors will not want to be exposed.

Also, there are non-visual attributes which may be relevant, for example technical background.

In some embodiments of the invention, an actor can define an image and/or other attributes which will be exposed to the view of other participants. An actor may also define profiles and/or identification of actors to whom various levels of details may be exposed.

In some embodiments of the invention, social networks may be defined, in which actors define, possibly in a non-reflexive manner, who can know what on who. Unwanted attentions may be filtered out using filters, as described above.

Real vs. Virtual Interactions

The interaction via the system may be separate or integrated with the real lives of the actors. For example, people can make new acquaintances (personal and/or business) via a large group interaction. In another example, a group of off-line buddies can form a group of on-line buddies, that, for example, share a particular slant on the event. In another example, a group of people may join up after they meet in an ad-hoc discussion group.

As described above in some examples, the real lives of the actors may affect the system behavior, for example by participants preferring to join a group that includes a buddy or prefer to have a question exposed to participants not in their buddy group. To this end, participants may enter real-life information, such as social acquaintances, into the system and use this information for setting various system defaults.

Control

Due to the large number of people in interactions as described above, there is a possibility of unexpected social trends or waves to appear. In some embodiments such waves are desirable. However, in other embodiments, such waves may disrupt the purpose of the event. One or more of the following techniques may be used, in some embodiments of the invention, to dampen such waves and/or prevent their appearance:

(a) Limiting available options and/or extracting an extra charge from participants that want a non-standard setting. Thus, synchronization to a small number of content lines or time lines can be enforced.

(b) Limiting information designation and viewing. One possible type of limitation is forcing the availability of the information to at least a certain number of participants or range of variance. Another type of limitation is limiting the ability of an individual to provide information to a very large number of participants. These limitations may be in force at all times, or they may be applied when a need is determined.

It is noted that the detection of such waves may be automatic or may require a human to view various feedback displays. The application of these techniques may be, for example, automatic or manual.

Time Waste Prevention

A participation in an event can also be wasted for more mundane reasons, for example, by spending too much time in discussion groups on irrelevant questions. A human moderator may detect such behavior and expel a participant from a group, possibly ranking him "undesirable". Alternatively or additionally, an automated software module may generate alerts to remind a participant of the passage of time. Alternatively or additionally, a question may be defined to be limited to only one or a small number of follow-up questions, so that once a satisfactory answer is presented, the ad-hoc group is dissolved. Alternatively or additionally, short answers to questions may be required. Alternatively or additionally, closed form rather than open form questions may be required. Such requiring can be, for example, by limiting the space or type of input allowed.

Trouble Makers

In any group of people, some cause troubles, on purpose or not. Trouble may be in the form of inappropriate language, language that does not meet certain set political correctness guidelines for an event and/or abusive behavior, such as attempts to flood a group or provide inappropriate ranking. One possible job of the moderators is to detect such people and deal with them. One or more of the following methods may be used:

(a) Reducing an actor's privileges, so that the actor is less visible, less able to affect the event and/or less able to communicate with other actors through the system. In one example, the commenting or question generation rate of an actor may be reduced.

(b) Hiding the actor from other actors, with or without notifying the troublesome actor. Optionally, such hiding will take the form of segregating the actor to groups having participants with which the actor had not had negative interactions.

(c) Preventing the actor from logging in to the system and/or joining the event. In one example, the connection rate may be reduced, so that an actor cannot generate a large number of automated connections.

(d) Forcing any input from the actor to pass through filters and/or mediators.

(e) Providing a complaint center for actors to complain to. Optionally links to the center are provided at key points, for example, when viewing an information item.

(f) Statistically sampling information items and passing the sampled items through a filter (e.g., for profanity) and/or to a human mediator. Optionally, the probability of sampling an item depends on one or more of: the exposure of the item to wide audiences or widely complaining audiences, the author of the item (e.g., keeping track of his record, identity, IP, geographical location, MAC address and/or other identifying information), preliminary filter results, lower ranking items, items ranked high by trouble makers and/or the ranking of the thread to which the item is posted.

(g) Filtering all items and forwarding failed items to a mediator, for censure and/or updating of language filters. Different filters (e.g., dictionaries) may be provided for different interactions and/or different audiences, for example, for supporting different languages.

(h) Detecting problematic actors based on their behavior, for example, their being a source of too many comments with low ranking.

(i) Detecting problematic actors based on their profile,. For example, having had complaints lodged against them in previous interactions.

The dealing with a problematic actor may be local, for example separation from a group with which he has negative interactions, or global, using system wide settings. In one example, a certain limiting interaction structure, such as QAC, with only ten answers per question (or one answer per actor), may be enforced.

A bad actor may be requested, by the mediator, to rephrase problematic submissions and/or may be warned when censored.

Privacy

In any interaction, some participants will want to maintain their privacy. This can be achieved, to some extent, for example, by preventing the dissemination of personal information. Optionally, the system can use personal information for performing activities that require invasion of privacy, such as targeting advertisements. However, since the personal information is not exposed, there is not loss of privacy.

In some embodiments of the invention, certain actors have the ability to eavesdrop. One, more benign example, is a teacher in an e-learning setting. A less benign example is a personnel recruiter that wants to see the potential personnel in action.

In some embodiments of the invention, a participant can trade-off privacy and cost, for example, paying more to take part in an event if he maintains more of his privacy. More than two privacy levels may be defined.

Security

Privacy and trouble making ability can both be functions of the privileges of an actor, for example to force a rank or to eavesdrop.

In some embodiments of the invention, privilege is automatically assigned by the system, for example if a participant becomes a presenter by virtue of a large following, he will get presenter's attributes. Alternatively or additionally, the privileges are manually handed out, for example by moderators. Optionally, humans may define limits on the privileges that certain actors can receive. These limitations may be fixed for the duration of an event, for example, to prevent unauthorized attainment of privileges.

Cost Offsetting and Incentives

Producing an event may be an expensive undertaking, even if the large number of participants lowers the costs. Various schemes may be provided to recoup the costs, including for example one or more of:

(a) Advertisement viewing instead of payment. However, a slow participant may not have time for viewing advertising, so his cost will go up.

(b) Rebates to a participant for performing at a higher level, such as that of a group leader, a moderator, a presenter or simply for answering questions posed by other participants. The rebate may depend, for example, on the quality of the participant's activity.

(c) Direct payment by participants.

(d) Royalties on books or other media generated as a result of the interaction.

A related subject is providing an incentive to a participant to assist other participants and/or the event itself. Alternatively or additionally to rebates, a participant may be offered, for example, social or professional recognition, offers to participate in other events, payments (e.g., direct, or as a percentage) from the participants that he assists.

Guiding Interaction Dynamics

An interaction event (or group decision making) may be characterized by its dynamics. One parameter is the focus of the event. At the extreme, an audience may overcome the presenter, for example, by all the audience joining a thread in which a participant is expounding his view on the subject, thereby changing the focus. At another extreme, the audience may be limited to discussing only exactly what is going on in the event, yielding a very focused event, which might lack interest. Another parameter is temporal synchrony, defined as the uniformity of the time lines of the different actors. Another parameter is synchronization, where in a highly synchronized event, the actors generally respond to each other within a time that is of the order of the interaction, while in a highly unsynchronized event, the response time is of a larger magnitude and/or of un known duration or variation. Another parameter is complexity, indicating the number of groups that are in existence at any time, relative to the number of groups that a participant could take part in.

Each of these parameters may have different desirable values, which may depend, for example, on the event, on the presenter, on the audience and/or on the number of available mediators. Generally, an event has ranges that are allowed and ranges that are desirable. In an exemplary embodiment of the invention, the parameters can be measured, for example, using the feedback mechanisms as described above.

In an exemplary embodiment of the invention, dynamics are guided by one or more of:

(a) Promoting parameter values changes.

(b) Damping parameter value changes.

(c) Setup tools for setting system parameters that affect the dynamics.

(d) Pre-event selecting of items that can be posted at will, to increase or reduce parameter values.

In an exemplary embodiment of the invention, an event focus is increased by one or more of preventing proliferation of questions, preventing splitting of groups, artificially killing old questions, lowering priority and/or exposure of questions that can increase proliferation of points of view, capping the number of questions that a participant can generate, capping the number of presentable answers for a question (e.g., to only two), splitting apart groups with copies of a same question to reduce interaction with a group, deleting groups, modifying a display to show information that promotes a more focused discussion, providing incentives to participants that are lagging behind, showing the structure of the interactions, and/or applying rate limitations on the number of items a participant can view or respond to.

In an exemplary embodiment of the invention, system settings may be modified to add friction. For example, make posting a question more difficult, will generally reduce the number of new questions. In another example, forcing a new group to form when a question is posted on an answer, and limiting that group to a sub-group of those interested in the original question, will also reduce discussion.

The above methods may also be applied to increase variation. Further, a mediator may be required to inject questions into the event, to wind-up the interest of the audience. Such injection may be under a pseudo-name or the mediator may be marked as a source.

A particular example of controlled interaction dynamics is the life of an event. For example, a group of experts may convene to discuss a subject, with a large audience listening in. This is a synchronous event. When the event is over, the event becomes asynchronous, in that participants can still send e-mails to each other, post to bulletin broads (possibly using the same tools as for a live interaction) and or even interact synchronously as small groups. Posting the content of the event allows the event to be replayed and/or browsed by interested participants. As a new problem looms (e.g., a building up political crises), the audience may begin to interact in a more synchronous manner. Alternatively, a mediator may start to synchronize the participants and/or the presenters (e.g., the expert group). Alternatively, the very increase in interaction between the members of the expert group, will reconvene the event, as an asynchronous event.

Administration

Setting up an event requires a certain amount of administration, some of it of types well known in the art. Optionally, the annals of previous events may be used to assist in finding suitable actors for a future event. By having participants pre-register for an event, a better plan may be achieved, in some cases.

Other administration activities include, for example, maintaining the database, maintaining hardware and/or maintaining software infrastructure.

In some embodiments, the mass interaction system is provided as a service to existing institutions, such as media networks and universities. In other embodiments, the mass interaction system is integrated with a more general service, such as e-learning. Particular example will be described below.

Exemplary Applications

Following are described various exemplary types of events to which some of the above embodiments may be applied. The applications selected are exemplary and each one only illustrates a small number of features which may be implemented. Thus, for example, features from one exemplary application may be utilized in a different application, possibly with features presented here in association with a third application.

Infomercials

The above described method may be used, for example, to present a new product to the public. Exemplary products include home repair toolkits and other gadgets usually presented using infomercials, toys, movies and other media events, and companies (pre-IPO road shows). The presentation may be continuous, allowing participants to join or leave at any time. In one embodiment, the presentation is to one or more focus groups, rather than the general public. In an alternative embodiment, the focus groups are selected from the audience, for example based on their interaction level or based on their request to join.

In an exemplary embodiment of the invention, the above ad-hoc discussion groups are used to collect feedback on the product from the audience. The moderators may be preselected to assist in maintaining a positive image of the presented product.

Product Support and Help Desk

In one embodiment of the invention, an interaction event is used for product support. The mechanism of question percolation and a previous database can be used to provide answers for questions of the consumers without the product provider being required to answer. Also, important questions or questions that many consumers have can be identified and may affect further product improvements or product presentation. Optionally, a presentation of instructions of using the product is used as a main event.

The features of receiving feedback from a consumer base, presenting new products and/or interactive and online usage instructions may also serve as the basis of CRM (consumer relations management), where the theme of the interaction event is using products from the company (or group of companies). Using the tools described above, it is also possible to track the interests of consumers, so not only can advertisements be targeted, so can product improvement and bug fixes.

In an exemplary embodiment, a service company, such as a cellular service provide has an ongoing interaction event regarding the usage of cellular phones. This interaction is used to provide the consumers with company news and to receive feedback.

Political Meetings

The methods described above may be used for a meeting between constituents and an existing or a potential politician. The feedback acquisition and presentation methods may assist the politician in understanding what the public wants, while also allowing the public to more easily express itself. In addition, members of the public have the ability to see if others agree with them or not. In this setting, the moderators and group leaders (who can answer questions) may be selected to prevent any sentiments against the politician and/or disagreeing voices from spreading around.

Optionally, the multiple time lines mechanism may be used to allow a politician to be actually on-line only a short time, while giving the appearance of being on-line a significant amount or even continuously.

Corporate Happy Hour

Similar to the political meeting, a large corporation can have a corporate meeting, using the methods described above. Such a meeting may be, for example periodic or special. In this type of meeting, not only can a company office present important information or a message to all the workers, feedback from the workers can be directly provided to the officer, without any political filtering by intermediate managers. The ranking, filtering and/or moderating mechanisms may be used to prevent overloading the officer, while privacy mechanisms may allow a questioner to maintain his privacy (and job).

Conferences

In a conference application, there may be more than one simultaneous presenter, often in separate threads. However, using the methods described herein, a participant can interact with two or presentations. Alternatively or additionally, interdependency between two lectures can be explored by participants, even if such interdependency was not originally anticipated. An advantage of the above ad-hoc group creation methods and/or other methods is that it allows participants to easily find peers having similar interests, which is one aspect of conferences. Alternatively or additionally, new presentation can be created ad-hoc, by a participant become a presenter, or more likely, part of a panel.

Mass Negotiation Tool

There are many instances where a person or groups of persons would like to negotiate with a group of people, for example, a city council with a block of residents regarding parking arrangements. The methods described above can allow such negotiation to tale place, especially allowing the residents to cluster into groups having similar stances on various issues.

In a related application, a group of buyers can form a cartel using the methods described above. Thus, the buyers can apply pressure on a manufacturer. Unlike other buyer cartels, a manufacturer may be able to immediately see that such a cartel has a large following and is united (or not) in its objects. Thus, the issues for which such cartels are formed may be resolved faster and/or with mutual satisfaction.

Stock Holders Meeting

A situation, which combines information presentation, mass negotiation and/or the creation of interest groups, is a stockholder meeting. In such meetings, often many stockholders do not have time or the ability to find other stockholders with similar views. In addition, some stockholders may have a problem understanding all the issues in the company report. The mechanism of question propagation, for example, may be useful in allowing all the stockholders to understand the issues to be decided at the meeting.

In another stock-related embodiment, a broker, stock owner, company and/or potential stock owner can participate in discussions on the significance of events, for example as they occur.

E-learning

A particular exemplary application is in remote learning via electronic means. One aspect typical of many educational interactions (but also of some other types of interactions) is that the subject matter of the interaction is limited and thus easier to manipulate using electronic means, such as limited glossaries, and key-word searches.

In a particular application, a participant is a student, a presenter is a teacher and a moderator may be a student, an advanced student or a teaching assistant. Optionally, a commentator who presents a different view form the main teacher is provided. Such a commentator may be a live commentator or may present information sources having a different slant on the subject matter being taught.

In an educational interaction, as well as in other types of interactions, it may be desirable to set requirements for the students. These requirements can be limited to grades, but may also include, for example, an attendance requirement, an interaction requirement (e.g., asking and/or answering questions, commenting and/or ranking), a minimal time with a lag below a certain amount (e.g., "live" attendance) and/or a ranking requirement (e.g., receiving a good rank from other students).

Such requirements may also be applied to situations where a participants way is paid by his interaction, for example product focus groups, where if a participant does not interact, he is not doing his job. In some cases, a participant will desire his participation to be measured, merely to assure himself he is receiving his money's worth.

The system described above can track these and other parameters and optionally generate at least some part of a student's grade automatically. Quizzes may be graded automatically.

An additional useful tool may be a homework grading and comparison tool. The grading feature of such a tool may be required for dealing with the large amount of work generated by the students. The comparison feature of such a tool may be useful to determine if students that have contact with each other present suspiciously similar homework. Optionally, homework is performed using an on-line system that generates random questions, so copying is made more difficult. Alternatively or additionally, the mechanism of group leaders or moderators may be used to assign some students to check the homework of other students. For example, those students who have shown themselves in class to understand the material may be assigned (e.g., for extra credits or payment) to review the homework of other students. This review may be secret with respect to the identification of the worker and/or the checker. Optionally, the analysis of class standing and/or participation may be used to identify potential teachers, especially in graduate classes, where students may be mature enough to be teachers.

It should be noted that homework may be an integral part of some educational events (e.g., class work). In some cases, the amount and/or type of homework may be personalized to match a particular student's needs.

An e-learning application may be on a lecture by lecture basis. In some embodiments however, a more complex hierarchy may be present, for example: participant, buddies, work-group, class, lecture, course, department and school. In some cases, a strict hierarchy is not present, for example members of a work group may share some classes but not others or a lecture (or course) may be part of more than one course (or department), in which case it may be presented in several slants. This hierarchy may affect various aspects of the application of the above methods, for example selection of participants for ad-hoc group.

Optionally, the feedback and personalization mechanism described above are used to provide a student with a personalized learning experience, which can match, for example one or more of:

(a) previous work experience or other knowledge;
(b) previous accredited courses;
(c) class standing;
(d) participation level;
(e) desired profession and/or interests;
(f) amount of time available for studying; and/or
(g) learning rate.

The existence of student groups may be used for assisting studying, for example, a class assignment can be given to known groups, or work groups can be created based on an analysis of the suitability of the students for working together in a desired manner. Alternatively or additionally, a presenter may confer with a group leader or provide the group leader with pre-class material, to assist in preparing the students for the class and/or preparing the class for the students.

In another e-learning situation, no pre-event hierarchy may be present, for example, in a lecture event given by a media or technology leader.

Another type of e Reaming situation is a corporate educational application. In such a situation, it may be important for the corporation to track the participation and/or ranking of the workers in the education program. A particular education need in many corporation is the product training. An optional tool which may be useful is the provision of simulations which can be used to test a salesman's ability. Based on the results of such simulated tests, personalized study plans may be prepared. Alternatively or additionally, the educational interaction is used in conjunction with- or to identify the need for other types of education, such as general salesmanship and customer relations. Such targeting of education materials may also be applied in other settings, educational or otherwise.

In an exemplary embodiment of the invention, a match is made between the available students and their properties and the lectures, courses and/or programs. This match may be used to find an optimal solution to a student's needs and/or for creating an optimal class plan.

Optionally, such matching continues through an educational experience. In one application, a student can be assured that he matches the class (or does not fit in), even if the student feels he is not good enough. The class ranking can also assist in such feedback. In another example, a class plan will change based on feedback from the students or about the students.

In an exemplary embodiment of the invention, a real-life experience from outside the "classroom" is integrated with a class. Exemplary experiences include experiments and media events. Thus, two (or more) main presentation channels may exist, the experience and the teacher, who comments on the experience.

In an exemplary embodiment of the invention, a camera feed at a student is used to allow another student, a moderator or a presenter to provide comments on a non-computer activity of the student, for example needle working.

Lesson design can follow the general guide rules described above, for example preparation of blackboard displays, notebooks, course books and multiple difficulty levels to match the student audience. Optionally, an additional consideration is the interdependence between two classes. Such interdependence can include, for example the subject matter of one class forming a prerequisite in another class. In another example, a course may be divided into a large plurality of data elements that can be taught in more than one order. These data elements are continuously presented, as a main time line and a student can join and/or leave at any time. Alternatively or additionally, planing of a particular lecture may take into account the actual (vs. planned) amount of material presented at a previous class.

Hyde Park Setting

In a Hyde park like application, the above described system can serve as a sounding board for participants who wish to have their ideas heard. If an idea is considered relevant, its ranking can increase, so more participants will hear it in one example, the system will assist a participant is determining which of the current presenters may be of sufficient interest for him. In another example, feedback to a presenter or a participant which generates content (e.g., questions) may suggest to that actor whether he should actually be a presenter and/or who the real audience of interest is. Alternatively or additionally, suggestions for improving his performance may be provided by the system or by other participants. It is noted that by such suggestions being private and/or the speaker identity secret, there is less risk of embarrassing the speaker.

News Critic

In some ways, the current media situation and especially the news industry, act as a Hyde-park situation. There are many presentation charmers and a participant may not know which one is of interest until he wasted a significant amount of time. Further, an integral part of news is often the interpretation of the facts/many people feel more comfortable with an interpretation that fits their view of the world.

In an exemplary embodiment of the invention, the above system is used to provide personalized reviews of media events. Alternatively or additionally, a participant can interact with other participants regarding various media events or sports events. Optionally, the personalization of news and/or presentation of real-time events includes presenting the news with a particular slant that matches the participants views. In some cases, a participant will share a view in a first matter with one participant and a view in a second matter with a second participant. By targeting each participant with items and interpretations that match his view, a better personalization of news may be achieved. Ad-hoc groups may be created and populated with participants having similar views on a matter (or a suitable mix of participants may be provided). Alternatively or additionally, a participant can interact with other participants of like views on the matters that interest him. As a participant's views change, he may leave one ad-hoc group and join another.

Alternatively or additionally to personalizing the presentation, a suitable commentary channel may be presented. Optionally different commentary channels or channel mixes are presented to different participants.

A related application is that of providing an interactive audience for talk shows and other media events where audience participation may be desired, especially for feedback. In an exemplary embodiment of the invention, the audience can, for example, vote on questions to ask a guest or how long the guest should remain on the show.

Group Think

In an exemplary embodiment of the invention, the above methods are used to assist a large group of people in decision-making and/or brain storming. The above methods of feedback and question propagation may be used, for example, to channel the efforts of the individuals into channels which are not being pursued by other individuals.

In a different example of group think, the above system can be used to mediate between players in Internet games, where each side of the game represents a very large number of players. The above-described methods may assist in such large numbers of participants to act coherently.

In another example of group decision support, a group interview is conducted, where some discussion groups generate questions for the subject of the interview, with the relevance of the questions being assessed before they reach the interviewee.

In another example of group decision support, an event may comprise the interaction between two groups of people, for example for mediation of quarrels between two identifiable social groups, such as ethnic minorities. Each group may be defined as a network of sub-groups, or such sub-groups may be defined ad-hoc based on the participant's perception of the input from the other group. Moderators may be provided, for example to suppress voices of dissension or hate. A main presenter may exist or several presentation channels may be created, for example by virtue of the emergence of strongly opinionated participants.

Instant Chat

In an exemplary embodiment of the invention, the above tools are used in a setting devoid of an event to provide instant chat groups on various subjects. Thus, if a participant poses a question, the above methodology of question propagation may be used to create a chat room and select other participants that are logged into the system, to populate the chat room. This can allow a participant to not only receive a fast answer to a question in a wide range of fields, but allow such a participant to hear a dissenting view (if one populates the chat room) and/or ask an expert that answers follow-up questions. Other participants may gain the benefit of hearing questions and answers in a subject that interests them. It should be noted that some participants may join such an ad-hoc group only after it runs for a while and meets certain ranking criteria they may have. Other participants may satisfy themselves by viewing a log or a summary of the ad-hoc group interaction.

Such an instant (if sometimes, temporary) community may also be gathered, for example, around other items of information, for example a WWW page, a news item or a subject of discussion in an on-line forum. It is noted that the participants being logged in does not necessarily require them to receive information from the system. Instead, the users may simply express the desire or agreement to participate, while en gaging in other activities.

One field which contains much interest to some users of the Internet is sex. In an exemplary embodiment of the invention, while preserving secrecy, participants can discover mates or other participants with similar interests and/or desires to participate in various actives. Another field where secrecy may be desired (or prohibited) is on-line meetings of support groups, such as alcohol abuse.

Non-computer Applications

The above applications have been described mainly with reference to computer-based application it should be noted however, that at least a reduced version of the system may be implemented without computers, per se. In one example, the presentation device is a cellular telephone, which can provide an audio cannel. A text channel may be used for some control and/or information channels. Alternatively or additionally, the time-line features may be used to allow a participant to stop listening to the lecture and join (or create or look for) a discussion group. When the side activity is completed, the participant may then rejoin the lecture at the point he left off, and the reminder of the lecture may be speeded up to allow the participant to catch up.

Implementation

The above-described system may be implemented in many ways. In particular, two possible implementations are a distributed implementation, using a plurality of distributed information servers and a centralized implementation, in which the entire interaction flows through a central location. A distributed implementation may use a hierarchy between servers, for example local servers and area servers. However, such hierarchy is not required, for example, in a pure peer-to-peer network is used. In an exemplary implementation, a single computer or computer network may include a database, information streaming and storing means, and software for personalizing the information sent to various participants (connected to the computer) based on the information stored in the database.

The client software at each participant depends on the implementation, but can vary, for example, between being a standard WEB browser, that allows a computer to act as a multi-media terminal and a local software client, such as a downloadable Java client or an executable, that can perform local processing, such as message filtering and/or managing the user interface.

In an exemplary embodiment of the invention, the use of local processing serves to enhance a feeling of interactivity by the participant, for example, allowing fast joining, group browsing, content posting and filtering of information.

In some embodiments of the invention, extensive use is made of existing tools, for example, data streaming tools, and video-conferencing tools. In some cases, a local client software can work with the existing implementation software, without requiring any changes in it, for example in the case of video streaming software and some embodiments of the invention.

In an exemplary embodiment of the invention, existing data distribution networks are used, for example the Internet, however other networks may be used as well. It is noted that in many applications, there is only one (or a small number) of video sources. Alternatively or additionally, in some embodiments, the bandwidth requirements may fluctuate, for example, as one presenter looses prominence and a second presenter gains widespread interest.

A plurality of local buffers may be required to supply the time manipulation features. Alternatively, the required storage and/or processing may be provided at the client stations or at a central location.

While the above description has focused on mass-interaction events, it should be appreciated that at least some of the above described methods and devices may be usefully applied to non-mass events, for example, for organizing discussions in chat rooms and for reducing information overload in other interactive and non-interactive situations. In another example, the methodology of reducing the amount of data to a level that can be assimilated by a user, is applied to a non-interactive situation, such as a user browsing a (possibly multithreaded) database. In another example, the above methods (e.g., ensuring that new content is exposed to at least a minimum group) are applied to an asynchronous situation, such as a bulletin-board configuration or a CRM center, to ensure that new messages receive a useful ranking. Alternatively or additionally to text information, the content that is disseminated may include, for example music, (e.g., for group selection of music programming for a radio station) or video clips.

It will be appreciated that the above described methods of assisting a group interaction may be varied in many ways, including, changing the order of steps and the methods of assistance used. In addition, a multiplicity of various features, both of method and of apparatus have been described. It should be appreciated that different features may be combined in different ways. In particular, not all the features shown above in a particular embodiment are necessary in every similar embodiment of the invention. Further, combinations of the above features are also considered to be within the scope of some embodiments of the invention. Also within the scope of the invention are hardware and/or software combinations and/or computer readable media containing software for carrying out the methods described above. Section headings are provided solely to assist in browsing the application and should not be construed as limiting the applicability of a feature described therein to only that particular section. When used in the following claims, the terms "comprises", "includes", "have" and their conjugates mean "including but not limited to".

The invention claimed is:

1. A method of supporting the happening of a mass-interaction event comprising:
   providing a mass interaction event, directed at collecting information from a plurality of participants, in which a plurality of participants interact with each other by generating information comprising at least one of questions, responses to questions and fact information for presentation to other participants and assimilating information; and
   controlling, automatically by a computer, the rate of information presentation to each participant of said plurality of participants, to be below a maximum information assimilation rate of said each participant.

2. A method according to claim 1, wherein said mass-interaction event is characterized by the event being time bound.

3. A method according to claim 1, wherein said mass-interaction event is characterized by the event having a general temporal order.

4. A method according to claim 1, wherein said mass-interaction event is characterized by the plurality of participants all attending to the event at the same time, while the event is going on.

5. A method according to claim 1, wherein said mass-interaction event is characterized by the plurality of participants expecting fast responses to information they generate.

6. A method according to claim 1, wherein said controlling comprises controlling in real-time.

7. A method according to claim 1, wherein said rate is less than 30 words per minute.

8. A method according to claim 1, wherein said rate is at least 30 words per minute.

9. A method according to claim 1, wherein said rate is at least 50 words per minute.

10. A method according to claim 1, wherein said rate is at least 100 words per minute.

11. A method according to claim 1, wherein said rate is at least 200 words per minute.

12. A method according to claim 1, wherein said rate is at least 300 words per minute.

13. A method according to claim 1, wherein said rate is fixed for the event.

14. A method according to claim 1, wherein said rate is dynamic for the event.

15. A method according to claim 1, wherein said rate varies between participants.

16. A method according to claim 1, wherein said rate is dependent on at least one of an expected difficulty by a participant in assimilating the information, an interruption rate of said participant, a number of different subjects covered by said information, a matching between said information and views of said participant and other activities of said participant.

17. A method according to claim 1, wherein said plurality of participants comprises at least 50 participants.

18. A method according to claim 1, wherein said plurality of participants comprises at least 100 participants.

19. A method according to claim 1, wherein said plurality of participants comprises at least 1000 participants.

20. A method according to claim 1, wherein said plurality of participants comprises at least 10,000 participants.

21. A method according to claim 1, wherein said plurality of participants comprises at least 100,000 participants.

22. A method according to claim 1, wherein said plurality of participants each has an average rate of information generation of at least 0.1 words per minute.

23. A method according to claim 1, wherein said plurality of participants each has an average rate of information generation of at least 1 word per minute.

24. A method according to claim 1, wherein said plurality of participants each has an average rate of information generation of at least 10 word per minute.

25. A method according to claim 1, wherein said event includes a plurality of passive listeners.

26. A method according to claim 1, wherein at least one of said participants comprises at least one presenter, characterized in the presenter generating a main line of said event.

27. A method according to claim 26, wherein said at least one presenter comprises at least two main presenters.

28. A method according to claim 26, comprising providing at least one set of presentation material used by said presenter to present said main line.

29. A method according to claim 26, wherein at least a subset of said plurality of participants can cooperate to change the main line of said event.

30. A method according to claim 1, wherein at least one of said participants comprises a mediator, characterized in the mediator at least assisting in organizing the event.

31. A method according to claim 30, wherein said mediator comprises a group mediator that mediates a discussion by a group of participants.

32. A method according to claim 30, wherein said mediator comprises an event mediator that assists in organizing the event as a whole.

33. A method according to claim 31, wherein said mediator comprises a controller mediator that prevents misuse of the event.

34. A method according to claim 30, wherein said at least one mediator is organized in a hierarchy of mediators.

35. A method according to claim 1, wherein at least one of said participants comprises a choreographer, characterized in the choreographer planning at least a part of the event.

36. A method according to claim 1, wherein at least one of said participants comprises an answering assistant, characterized in the answering assistant answering questions raised by other participants.

37. A method of supporting the happening of a mass-interaction event, comprising:
providing a mass interaction event in which a plurality of participants interact with each oilier by generating information comprising at least one of questions, responses to questions and fact information for presentation to other participants and assimilating information; and
controlling, automatically by a computer, the rate of information presentation to each participant of said plurality of participants, to be below a maximum information assimilation rate of said each participant,
wherein controlling the rate comprises controlling the rate using different methods for different participant types.

38. A method according to claim 1, wherein controlling the rate comprises providing different time lines for different participants.

39. A method according to claim 38, wherein different time lines are characterized by having different progression rates for different parts of the time line.

40. A method according to claim 38, wherein different time lines are characterized by having different content order of content of said event.

41. A method according to claim 38, wherein different time lines are characterized by covering different content.

42. A method according to claim 38, comprising providing a participant with a tool showing different time lines being used by other participants.

43. A method according to claim 38, comprising providing a participant with a tool for accelerating the flow of information in his time line to join a different time line.

44. A method according to claim 38, comprising allowing an unlimited number of time lines at one time for different participants.

45. A method according to claim 38, comprising allowing only a limited number of time lines at one time for different participants.

46. A method according to claim 38, wherein at least one of the participants is a presenter and wherein said presenter operates according to a time line, delayed relative to the time line of other participants, to allow the presenter time to interact with other participants without slowing down the rate of information presentation.

47. A method according to claim 1, wherein controlling the rate comprises using the participants as a computational resource to reduce the amount of presented information.

48. A method according to claim 47, wherein using the participants as a resource comprises using rankings of elements of said event provided by the participants.

49. A method according to claim 48, wherein said ranking is explicit by said participants.

50. A method according to claim 48, wherein said ranking is implicit by the actions of said participants.

51. A method according to claim 47, wherein using the participants as a resource comprises using participants to answer questions raised by other participants.

52. A method according to claim 47, wherein using the participants as a resource comprises using participants to prevent misuse of the event.

53. A method according to claim 47, wherein using the participants as a resource comprises using participants to drop questions raised by other participants.

54. A method according to claim 1, wherein controlling the rate of information presentation comprises reducing a rate of information presentation to a presenter of the event.

55. A method according to claim 54, wherein said reducing comprises providing feedback to said presenter.

56. A method according to claim 55, wherein said feedback comprises at least one of an indication of points in the time line that slow participants the most, questions that have large group followings, polarization and fractionalization of the participants, statistics of content-related and unrelated messages between participants, number of interacting participants, number of questions that are not joined by a certain number of participants or by participants of different groups and ranking of at least one of questions, discussions and answers.

57. A method according to claim 55, wherein said feedback comprises at least one statistic of feedback from at least a sample of the participants.

58. A method according to claim 55, wherein said feedback is provided continuously to said presenter.

59. A method according to claim 55, wherein said feedback includes open-ended feedback sentences.

60. A method according to claim 59, comprising offering a participant the option of joining a free-text feedback response of a different participant.

61. A method according to claim 1, wherein controlling the rate of information presentation comprises filtering presented information based on ranking of the information.

62. A method according to claim 61, wherein said ranking is a scalar value.

63. A method according to claim 61, wherein said ranking is a vector of values.

64. A method according to claim 61, wherein said filtering comprises automatically modifying said filtering to achieve a desired presentation rate.

65. A method according to claim 61, wherein said filtering is performed at a private computing station associated with a participant.

66. A method according to claim 61, wherein said filtering is performed at a central computing station not associated with a single participant.

67. A method according to claim 61, wherein said filtering comprises filtering based on an association of said participant to a group of participants.

68. A method according to claim 61, wherein said filtering comprises automatically selecting whether to expose a participant to a question.

69. A method according to claim 61, wherein said filtering comprises keyword based filtering.

70. A method according to claim 61, wherein said filtering comprises subject based filtering.

71. A method according to claim 61, wherein said filtering comprises ranking based filtering.

72. A method according to claim 1, wherein controlling the rate of information presentation comprises restructuring the presentation to better suit assimilation abilities of said participant.

73. A method according to claim 72, wherein restructuring comprises reordering presented information to reduce interruptions during an attending of a subject by a participant.

74. A method according to claim 72, wherein restructuring comprises reordering presented information to form a series of segments, each segment having a single subject.

75. A method according to claim 1, wherein controlling the rate comprises maintaining at least a minimum rate of interaction between participants.

76. A method according to claim 75, wherein maintaining at least a minimum rate comprises injecting questions by a controller of said event.

77. A method according to claim 1, wherein controlling the rate of information presentation, comprises causing a reduction in the propagation of information between participants.

78. A method according to claim 77, wherein said reduction in propagation does not reduce an interactivity level of said event, as felt by said participants.

79. A method according to claim 77, comprising exposing a new item of information to at least a minimum number of participants, to ensure a useful exposure of the item.

80. A method according to claim 79, wherein said useful exposure comprises an exposure sufficient to provide a meaningful ranking of said item, said ranking being used for a decision on further exposure of said item.

81. A method according to claim 80, wherein said meaningful ranking comprises a statistically meaningful ranking.

82. A method according to claim 79, wherein said useful exposure comprises exposing said item to a varied set of participants.

83. A method according to claim 79, wherein said useful exposure comprises exposing said item to at least one leading participant, which participant has a greater authority than other of said participants.

84. A method according to claim 79, comprising trading off said controlling of exposure rate and said exposing to a minimum number of participants, to achieve a desired perceived level of interactivity.

85. A method according to claim 77, comprising generating an ad-hoc group of participants to which a question is exposed, to limit a propagation of the question, at least at a first stage, to said group.

86. A method according to claim 85, wherein said group is dissolved after said question is answered.

87. A method according to claim 85, comprising splitting said group to control an information presentation rate to members of said group.

88. A method according to claim 85, comprising encouraging a participant to join an existing question rather than creating a new question.

89. A method according to claim 88, wherein said encouraging comprises exposing questions to participants that are expected to be interested in the question and offering the participants to join the question.

90. A method according to claim 85, wherein said questions are presented in a structure suitable for locating a question of interest by a participant.

91. A method according to claim 90, wherein said questions are organized by subject.

92. A method according to claim 90, wherein said questions are organized according to a structure of said event.

93. A method according to claim 92, wherein said questions are organized to a presentation material prepared for said event.

94. A method according to claim 90, wherein said questions are associated with a search engine for search said questions.

95. A method according to claim 90, wherein at least one of said questions is generated during said event.

96. A method according to claim 90, wherein at least one of said questions is generated during a previous event.

97. A method according to claim 85, comprising selective propagation of participant-generated content generated within said group to outside of said group.

98. A method according to claim 97, wherein said propagation is according to a hierarchical organization of said participants.

99. A method according to claim 98, wherein a presenter of said event, that generates a main line of said event, is included in said hierarchy.

100. A method according to claim 77, comprising controlling at least one of a damping rate and propagation distances of participant generated content.

101. A method according to claim 77, comprising imposing a structure on the event, which structure reduces opportunities for proliferation of information.

102. A method according to claim 101, wherein organizing the event comprises structuring a question and answer session to match one of a limited number of templates.

103. A method according to claim 77, comprising increasing an effectiveness of propagated information.

104. A method according to claim 103, wherein increasing an effectiveness of propagation of information comprises selecting information for propagation based on ranking by other participants.

105. A method according to claim 103, wherein increasing an-effectiveness of propagation of information comprises grouping said participants into groups having a participant mix that encourages useful interaction.

106. A method according to claim 105, wherein said mix includes at least one participant expected to be able to correctly answer a posed question.

107. A method according to claim 105, wherein said mix includes at least one participant expected to be able to moderate a discussion in said group.

108. A method according to claim 105, wherein said mix is selected to statistically represent said plurality of participants.

109. A method according to claim 1, wherein said event comprises one of a lecture, an entertainment event, an e-learning session, sales meeting, training session, product launch, product focus group meeting, corporate lecture, conference, stockholder's meeting and help desk.

110. A method according to claim 1, comprising analyzing said interactions between said participants to extract information about at least one of said participants.

111. A method according to claim 110, wherein said information about participants comprises an identification of participants having desirable personal qualities.

112. A method according to claim 111, wherein said information about participants comprises an identification of participants qualified to answer questions.

113. A method according to claim 1, comprising analyzing said interactions between said participants to extract information about said event.

114. A method according to claim 113, wherein said extracted information comprises ordered discussion threads.

115. A method of at least partly optimizing discussion groups, comprising:
  providing an issue to be discussed; and
  automatically gathering at least four people into a group, by a computer, for said discussion, responsive to said issue,
  wherein the gathering comprises modifying the content of said group to achieve a desired effect and wherein said modifying comprises modifying the content of the group responsive to existing group dynamics of discussions of the group.

116. A method according to claim 115, wherein said gathering of people comprises initially gathering participants into said group.

117. A method according to claim 115, wherein the gathering of people comprises maintaining a previous gathering of people into said group.

118. A method according to claim 115, wherein the gathering of people comprises modifying the content of said group to achieve a desired effect.

119. A method according to claim 118, wherein said modifying comprises modifying the content of the group responsive to existing group dynamics of discussions of the group.

120. Apparatus for carrying out a method according to claim 1, comprising a computer and a memory storing therein software for programming said computer.

121. A method according to claim 1, wherein providing the mass interaction event comprises providing an event directed at achieving a desired goal.

122. A method according to claim 1, wherein the controlling the rate of presentation of information comprises controlling a number and identity of zero or more interactive sub-groups to which the participant belongs.

123. A method according to claim 1, wherein providing the mass interaction event comprises providing an event in which information from at least one source is provided to substantially all the participants.

124. A method according to claim 1, wherein the rate of information presentation to each participant is controlled by a moderator and not by the participant.

125. A method according to claim 26, comprising providing to the presenter feedback on an audience comprehension level or on particular problems experienced by the audience.

126. A method according to claim 26, comprising automatically analyzing feedback generated by participants other than the presenter.

127. A method according to claim 1, comprising automatically generating a summary of the information of the event.

128. A method according to claim 1, wherein providing the mass interaction event comprises providing an event that follows a plan.

129. A method according to claim 1, wherein the mass interaction event is directed at aiding the presenter in decision making, by receiving information from the other participants.

130. A method according to claim 1, wherein controlling the rate of information presentation is performed at least partially based on rankings of information, provided by a sub-group of the participants.

131. A method according to claim 1, wherein controlling the rate of information presentation comprises maintaining a desired feeling of interactivity.

132. A method of supporting the happening of a mass-interaction event, comprising:
  providing a mass interaction event in which a plurality of participants interact with each other by generating information comprising at least one of questions, responses to questions and fact information for presentation to other participants and assimilating information; and
  controlling, automatically by a computer, the rate of information presentation to each participant of said plurality of participants, to be below a maximum information assimilation rate of said each participant, at least partially by controlling a number and identity of interactive sub-groups of the participants, to which the participant belongs.

133. A method of supporting the happening of a mass-interaction event, comprising:
   providing a mass interaction event in which a plurality of participants interact with each other by generating information comprising at least one of questions, responses to questions and fact information for presentation to other participants and assimilating information; and
   controlling, automatically by a computer, the rate of information presentation to each participant of said plurality of participants, to be below a maximum information assimilation rate of said each participant,
   wherein the computer presents at least one piece of information to a first group of participants and determines a second group of participants to receive the at least one piece of information responsive to ratings received from one or more members of the first group of participants.

134. A method according to claim 133, wherein providing the mass interaction event comprises providing an event directed at achieving a desired goal of an organizer of the event.

135. A method according to claim 133, wherein controlling the rate of presentation of information comprises controlling a number and identity of zero or more interactive sub-groups to which the participant belongs.

136. A method of at least partly optimizing discussion groups, comprising:
   providing an issue to be discussed; and
   automatically gathering at least four people into a group, by a computer, for said discussion, responsive to said issue,
   wherein providing an issue to be discussed comprises identifying an issue that warrants a separate discussion, and wherein gathering people into a group comprises generating an ad hoc group to discuss the issue and gathering the people into the ad hoc group.

137. A method according to claim 132, wherein controlling the rate comprises using the participants as a computational resource to reduce the amount of presented information.

138. A method according to claim 137, wherein using the participants as a resource comprises using rankings of elements of said event provided by the participants.

139. A method according to claim 138, wherein said rankings are explicit by said participants.

140. A method according to claim 138, wherein said rankings are implicit by the actions of said participants.

141. A method according to claim 137, wherein using the participants as a resource comprises using participants to answer questions raised by other participants.

142. A method according to claim 137, wherein using the participants as a resource comprises using participants to prevent misuse of the event.

143. A method according to claim 137, wherein using the participants as a resource comprises using participants to drop questions raised by other participants.

144. A method according to claim 132, wherein said event comprises one of a lecture, an entertainment event, an e-learning session, sales meeting, training session, product launch, product focus group meeting, corporate lecture, conference, stockholder's meeting and help desk.

145. A method according to claim 132, wherein providing the mass interaction event comprises providing an event directed at achieving a desired goal.

146. A method according to claim 132, wherein providing the mass interaction event comprises providing an event in which information from at least one source is provided to substantially all the participants.

147. A method according to claim 132, wherein the rate of information presentation to each participant is controlled by a moderator and not by the participant.

148. A method according to claim 132, wherein at least one of said participants comprises at least one presenter and the method comprises providing to the presenter feedback on an audience comprehension level or on particular problems experienced by the audience.

149. A method according to claim 132, wherein at least one of said participants comprises at least one presenter and the method comprises automatically analyzing feedback generated by participants other than the presenter.

150. A method according to claim 132, comprising automatically generating a summary of the information of the event.

151. A method according to claim 132, wherein providing the mass interaction event comprises providing an event that follows a plan.

152. A method according to claim 132, wherein the mass interaction event is directed at aiding the presenter in decision making, by receiving information from the other participants.

153. A method according to claim 132, wherein controlling the rate of information presentation is performed at least partially based on rankings of information, provided by a sub-group of the participants.

154. A method according to claim 132, wherein controlling the rate of information presentation comprises maintaining a desired feeling of interactivity.

155. A method according to claim 133, wherein the controlling the rate of presentation of information comprises controlling a number and identity of zero or more interactive sub-groups to which the participant belongs.

156. A method according to claim 133, wherein controlling the rate of information presentation comprises maintaining a desired feeling of interactivity.

157. A method according to claim 133, wherein said event comprises one of a lecture, an entertainment event, an e-learning session, sales meeting, training session, product launch, product focus group meeting, corporate lecture, conference, stockholder's meeting and help desk.

158. A method according to claim 133, wherein providing the mass interaction event comprises providing an event directed at achieving a desired goal.

159. A method according to claim 133, wherein providing the mass interaction event comprises providing an event in which information from at least one source is provided to substantially all the participants.

160. A method according to claim 133, wherein the rate of information presentation to each participant is controlled by a moderator and not by the participant.

161. A method according to claim 133, wherein at least one of said participants comprises at least one presenter and the method comprises providing to the presenter feedback on an audience comprehension level or on particular problems experienced by the audience.

162. A method according to claim 133, wherein at least one of said participants comprises at least one presenter and the method comprises automatically analyzing feedback generated by participants other than the presenter.

163. A meted according to claim 133, comprising automatically generating a summary of the information of the event.

164. A method according to claim 133, wherein providing the mass interaction event comprises providing an event that follows a plan.

165. A method according to claim 133, wherein the mass interaction event is directed at aiding the presenter in decision making, by receiving information from the other participants.

* * * * *